(12) United States Patent
Mori et al.

(10) Patent No.: US 10,766,077 B2
(45) Date of Patent: Sep. 8, 2020

(54) CUTTING TOOL

(71) Applicant: SUMITOMO ELECTRIC HARDMETAL CORP., Itami-shi (JP)

(72) Inventors: Yoshikatsu Mori, Itami (JP); Kouki Matsubara, Itami (JP); Ryusei Hamada, Itami (JP); Masaaki Jindai, Itami (JP); Kazuhiko Kashima, Itami (JP); Yasuhiro Kajiwara, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/082,029

(22) PCT Filed: Feb. 27, 2017

(86) PCT No.: PCT/JP2017/007522
§ 371 (c)(1),
(2) Date: Sep. 4, 2018

(87) PCT Pub. No.: WO2017/150459
PCT Pub. Date: Sep. 8, 2017

(65) Prior Publication Data
US 2019/0232388 A1    Aug. 1, 2019

(30) Foreign Application Priority Data

Mar. 4, 2016 (JP) ................................. 2016-042308

(51) Int. Cl.
| | | |
|---|---|---|
| B23B 31/107 | (2006.01) | |
| B23B 51/06 | (2006.01) | |
| B23B 51/02 | (2006.01) | |

(52) U.S. Cl.
CPC ........ *B23B 31/107* (2013.01); *B23B 31/1075* (2013.01); *B23B 51/02* (2013.01);
(Continued)

(58) Field of Classification Search
CPC .......... B23B 31/07; B23B 51/00; B23B 51/06
See application file for complete search history.

(56) References Cited

U.S. PATENT DOCUMENTS

| 8,449,227 B2* | 5/2013 | Danielsson | ............. B23B 51/02 |
| | | | 408/226 |
| 2010/0322731 A1* | 12/2010 | Aare | ....................... B23B 51/02 |
| | | | 408/226 |

(Continued)

FOREIGN PATENT DOCUMENTS

| EP | 2 368 657 A1 | 9/2011 |
| EP | 2 939 774 A1 | 11/2015 |

(Continued)

*Primary Examiner* — Nicole N Ramos
(74) *Attorney, Agent, or Firm* — Baker Botts L.L.P.; Michael A. Sartori

(57) ABSTRACT

The holder has a first surface and a second surface. The head includes a cutting edge portion and a shank portion. The holder is provided with a first hole and a second hole communicating with the first hole, the first hole extending in a third direction inclined by a second angle relative to a second direction extending from the second surface toward the first surface when viewed in a direction parallel to the axis line. The shank portion has a flat surface portion, and is provided inside the second hole. The fastening portion is provided inside the first hole, and is in contact with the flat surface portion. In a plane perpendicular to the axis line, a third angle between the second direction and a fourth direction perpendicular to the flat surface portion is larger than the second angle. The third angle is less than 90°.

8 Claims, 20 Drawing Sheets

(52) U.S. Cl.
CPC .......... *B23B 51/06* (2013.01); *B23B 2251/02* (2013.01); *B23B 2270/58* (2013.01)

(56) References Cited

U.S. PATENT DOCUMENTS

2012/0014760 A1    1/2012   Glimpel et al.
2015/0328693 A1    11/2015   Koga

FOREIGN PATENT DOCUMENTS

| JP | 2005-144655 A | 6/2005 |
| JP | 2007-245295 A | 9/2007 |
| JP | 2011-005631 A | 1/2011 |
| JP | 2011-005632 A | 1/2011 |
| JP | 2012-520777 A | 9/2012 |
| WO | 2014/103972 A1 | 7/2014 |

* cited by examiner

CUTTING TOOL

TECHNICAL FIELD

The present invention relates to a cutting tool. The present application claims a priority based on Japanese Patent Application No. 2016-042308 filed on Mar. 4, 2016, the entire content of which is incorporated herein by reference.

BACKGROUND ART

For example, Japanese Patent Laying-Open No. 2007-245295 (Patent Document 1) discloses a drill having a main body portion to and from which an insert is attachable and detachable. An insertion hole is provided in the main body portion of the drill and a clamp screw is disposed in the insertion hole. By fastening the clamp screw, the clamp screw is brought into abutment with a shank portion of the insert, whereby the insert is fixed to the main body portion.

Moreover, a holder of a drill described in Japanese Patent Laying-Open No. 2005-144655 (Patent Document 2) is provided with: a shank hole into which an insert is insertable; and a bolt hole communicating with the shank hole. The bolt hole extends in a direction inclined relative to the extending direction of the shank hole. A fastening bolt is disposed in the bolt hole and is brought into abutment with an inclined groove of the insert, whereby the insert is fixed to the holder.

Further, Japanese Patent Laying-Open No. 2011-5632 (Patent Document 3) discloses a rotary tool including: a base provided with a center hole; a loose top having a pin; and a radial screw. The pin of the loose top is inserted into the center hole. The loose top is locked in the axial direction by the radial screw.

Furthermore, WO2014/103972 (Patent Document 4) discloses a drill including: a cutting tip having a shaft foot; a holder provided with a shaft receiving hole and a through hole; and a fixing member. The shaft foot of the cutting tip is inserted in the shaft receiving hole of the holder. The fixing member is inserted in the through hole and is in contact with the shaft foot.

CITATION LIST

Patent Document

PTD 1: Japanese Patent Laying-Open No. 2007-245295
PTD 2: Japanese Patent Laying-Open No. 2005-144655
PTD 3: Japanese Patent Laying-Open No. 2011-5632
PTD 4: WO2014/103972

SUMMARY OF INVENTION

A cutting tool according to one embodiment of the present invention includes a holder, a head, and a fastening portion. The holder has a first surface and a second surface provided to be separated from each other to sandwich an axis line. The head includes a cutting edge portion located between the first surface and the second surface, and a shank portion configured to hold the cutting edge portion. The fastening portion is configured to fix the head to the holder. The holder is provided with a first hole and a second hole, the first hole extending in a first direction and a third direction, the first direction being inclined by a first angle toward the cutting edge portion relative to a direction perpendicular to the axis line, the third direction being inclined by a second angle relative to a second direction extending from the second surface toward the first surface when viewed in a direction parallel to the axis line, the second hole communicating with the first hole, the second hole extending in the direction parallel to the axis line. The shank portion has a flat surface portion, and is provided inside the second hole. The fastening portion is provided inside the first hole, and is in contact with the flat surface portion. In a plane perpendicular to the axis line, a third angle between the second direction and a fourth direction perpendicular to the flat surface portion is larger than the second angle. The third angle is less than 90°.

DESCRIPTION OF EMBODIMENTS

Figure 1:
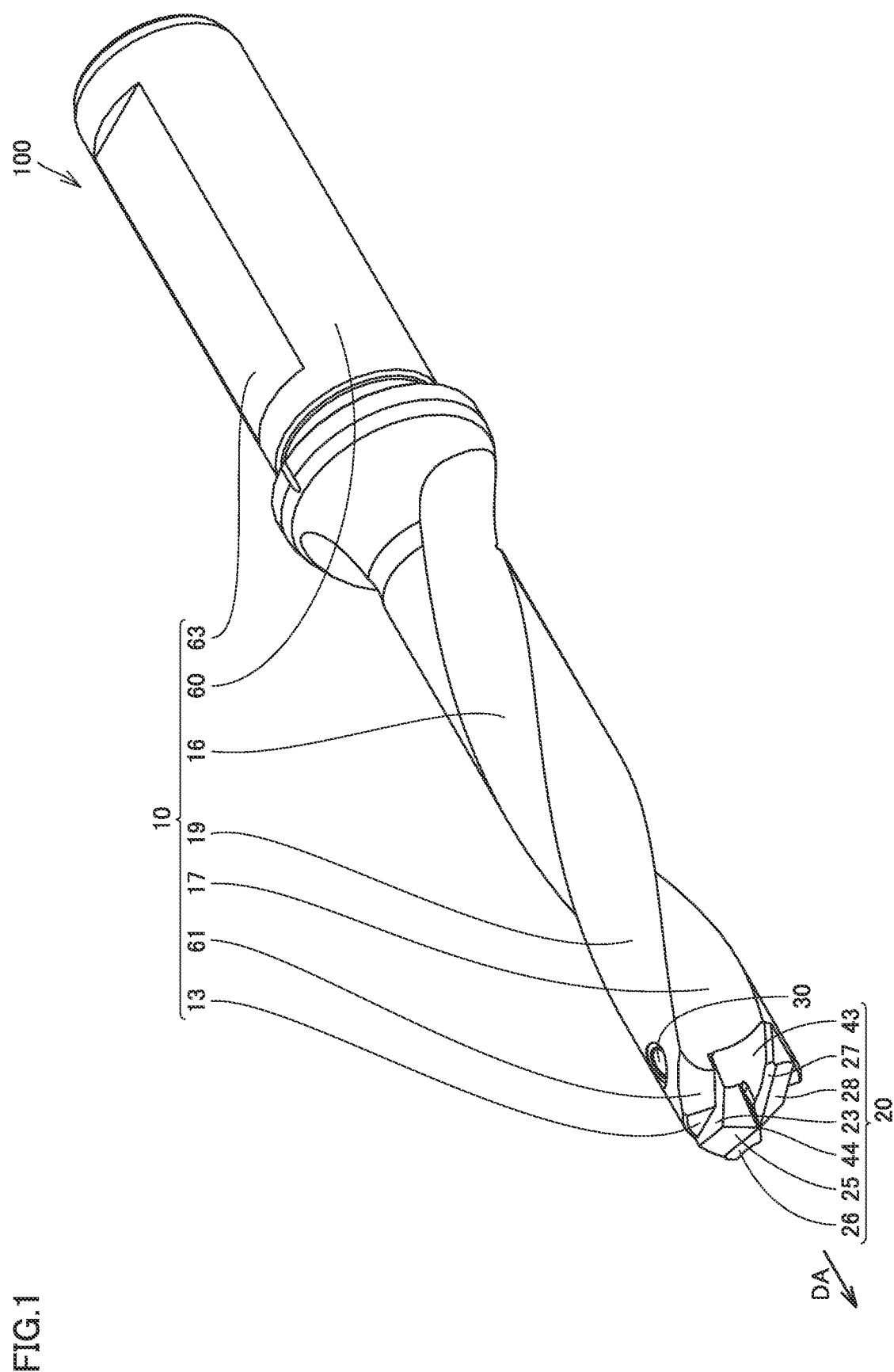
FIG. 1 is a schematic perspective view showing a configuration of a cutting tool according to a first embodiment.

Problem to be Solved by the Present Disclosure

In the case of a drill, the head of the drill is fixed to a holder such that the center of the head of the drill coincides with the center of the holder, unlike a case of fixing a general insert for milling or turning using a screw. Further, the drill requires a structure for receiving, by a side surface of the head and a wall portion of the body, cutting force applied in the rotation direction and for bringing the head into close contact with the holder side.

In the drill described in Japanese Patent Laying-Open No. 2007-245295 (Patent Document 1), when fastening the clamp screw, force in the rotation direction and a drawing direction is applied to the head. Since the clamp screw is in contact with the head only at one point, sufficient clamping force is not obtained, with the result that the head cannot be firmly fixed to the holder.

In the drill described in Japanese Patent Laying-Open No. 2005-144655 (Patent Document 2), in order to facilitate removal of the head, there is a space between the shank portion of the head and the hole of the holder engaged with the shank portion. Hence, the head can be moved and therefore cannot be precisely fixed to the holder. As a result, the head may be moved during machining, with the result that sufficient performance may not be obtained.

One embodiment of the present invention has been made to solve the problem with regard to clamping of the head of such a drill or the like, and has an object to provide a cutting tool in which a head can be fixed to a holder firmly and precisely.

Advantageous Effect of the Present Disclosure

According to one embodiment of the present invention, there can be provided a cutting tool in which a head can be fixed to a holder firmly and precisely.

Summary of Embodiment of the Present Invention

First, summary of the embodiment of the present invention will be described.

(1) A cutting tool 100 according to one embodiment of the present invention includes a holder 10, a head 20, and a fastening portion 30. Holder 10 has a first surface 11 and a second surface 12 provided to be separated from each other to sandwich an axis line DA. Head 20 includes a cutting edge portion 51 located between first surface 11 and second surface 12, and a shank portion 52 configured to hold cutting edge portion 51. Fastening portion 30 is configured to fix head 20 to holder 10. Holder 10 is provided with a first hole H1 and a second hole H2, first hole H1 extending in a first direction D1 and a third direction D3, first direction D1 being inclined by a first angle $\theta 1$ toward cutting edge portion 51 relative to a direction perpendicular to axis line DA, third direction D3 being inclined by a second angle $\theta 2$ relative to a second direction D2 extending from second surface 12 toward first surface 11 when viewed in a direction parallel to axis line DA, second hole H2 communicating with first hole H1, second hole H2 extending in the direction parallel to axis line DA. Shank portion 52 has a flat surface portion 21, and is provided inside second hole H2. Fastening portion 30 is provided inside first hole H1, and is in contact with flat surface portion 21. In a plane perpendicular to axis line DA, a third angle $\theta 3$ between second direction D2 and a fourth direction D4 perpendicular to flat surface portion 21 is larger than second angle $\theta 2$. Third angle $\theta 3$ is less than 90°.

As a result of diligent study on a method of firmly fixing a head to a holder, the present inventors obtained the following knowledge and found one embodiment of the present invention. Specifically, analysis has been made with regard to a method of suppressing movement of head 20 in the rotation direction while drawing shank portion 52 of head 20 into second hole H2 of holder 10. First, holder 10 was provided with first hole H1 extending in first direction D1 inclined by first angle $\theta 1$ toward cutting edge portion 51 relative to the direction perpendicular to axis line DA. Fastening portion 30 was provided inside first hole H1 and was configured to be in contact with flat surface portion 21 of shank portion 52 of head 20. Fastening portion 30 presses flat surface portion 21 of shank portion 52, thereby drawing shank portion 52 into second hole H2 of holder 10. Moreover, when viewed in the direction parallel to axis line DA, the extending direction of first hole H1 was set to be third direction D3 inclined by second angle $\theta 2$ relative to second direction D2 extending from first surface 11 toward second surface 12, and third angle $\theta 3$ between second direction D2 and fourth direction D4 perpendicular to flat surface portion 21 was made larger than second angle $\theta 2$. Accordingly, when fastening portion 30 is fastened, torque in the rotation direction can be applied to flat surface portion 21. As a result, one end surface 23 of head 20 can be pressed against first surface 11 of holder 10 and the other end surface 24 of head 20 can be pressed against second surface 12 of holder 10. Accordingly, head 20 can be fixed to holder 10 firmly and precisely.

(2) In cutting tool 100 according to (1), first angle $\theta 1$ may be more than or equal to 13°. Accordingly, shank portion 52 of head 20 can be drawn effectively into second hole H2 of holder 10.

(3) In cutting tool 100 according to (1) or (2), second angle $\theta 2$ may be more than or equal to 10° and less than or equal to 45°.

(4) In cutting tool 100 according to any one of (1) to (3), a value obtained by subtracting second angle $\theta 2$ from third angle $\theta 3$ may be less than or equal to 5°. Accordingly, when fastening portion 30 is fastened, torque in the rotation direction can be applied effectively to flat surface portion 21. As a result, head 20 can be fixed to holder 10 more firmly and more precisely.

(5) In cutting tool 100 according to any one of (1) to (4), cutting edge portion 51 may include a third surface 23 facing first surface 11, and a fourth surface 24 facing second surface 12. When viewed in the direction parallel to axis line DA, a minimum distance L3 between first surface 11 and axis line DA may be longer than a minimum distance L4 between second surface 12 and axis line DA, and a minimum distance L1 between third surface 23 and axis line DA may be longer than a minimum distance L2 between fourth surface 24 and axis line DA. When minimum distance L3 is the same as minimum distance L4 and minimum distance L1 is the same as minimum distance L2, head 20 can be fixed to holder 10 such that third surface 23 of head 20 faces first surface 11 of holder 10 and fourth surface 24 of head 20 faces second surface 12 of holder 10, or conversely, head 20 can be fixed to holder 10 such that third surface 23 of head 20 faces second surface 12 of holder 10 and fourth surface 24 of head 20 faces first surface 11 of holder 10. Meanwhile, since first hole H1 is formed only at one of the first surface 11 side and the second surface 12 side of holder 10, flat surface portion 21 of head 20 is not in abutment with fastening portion 30 if head 20 is conversely attached. In particular, head 20 may be attached to holder 10 under a circumstance involving a difficulty in visual observation thereof. By configuring holder 10 and head 20 as in the present embodiment, head 20 can be prevented from being attached to holder 10 in a wrong direction.

(6) In cutting tool 100 according to any one of (1) to (5), shank portion 52 may have a contact portion 72 opposite to flat surface portion 21, and may be provided with a swaging prevention groove 47 located between flat surface portion 21 and contact portion 72. If the space between shank portion 52 and second hole H2 is small, shank portion 52 may become unable to be removed from second hole H2 once shank portion 52 is inserted in second hole H2. By providing swaging prevention groove 47 in shank portion 52, shank portion 52 can be prevented from being unable to be removed from second hole H2.

(7) In cutting tool 100 according to any one of (1) to (6), a coolant feed passage H3 may be provided in holder 10. When viewed in the direction parallel to axis line DA, an opening 65 of coolant feed passage H3 may be exposed from a groove 48 provided in cutting edge portion 51. Swarf is normally discharged to outside via the flute portion. Hence, for example, if the opening of coolant feed passage H3 is formed at the flute portion, the coolant sent out from the opening is blocked by the swarf, with the result that the contact portion between the cutting edge portion and the workpiece cannot be cooled effectively. On the other hand, in the case of the present embodiment, the coolant can be supplied forwardly of cutting edge portion 51. Hence, a contact portion between the cutting edge portion and a workpiece can be cooled effectively.

(8) In cutting tool 100 according to any one of (1) to (6), a coolant feed passage H3 may be provided in holder 10. When viewed in the direction parallel to axis line DA, an opening 65 of coolant feed passage H3 may be exposed at a through hole 53 provided in cutting edge portion 51. Accordingly, the coolant can be supplied forwardly of cutting edge portion 51. Hence, a contact portion between the cutting edge portion and a workpiece can be cooled effectively.

Description of Embodiment

The following describes embodiments of the present invention with reference to figures. It should be noted that in the below-mentioned figures, the same or corresponding portions are given the same reference characters and are not described repeatedly.

First Embodiment

First, the following describes a configuration of a cutting tool 100 according to a first embodiment.

Figure 2:
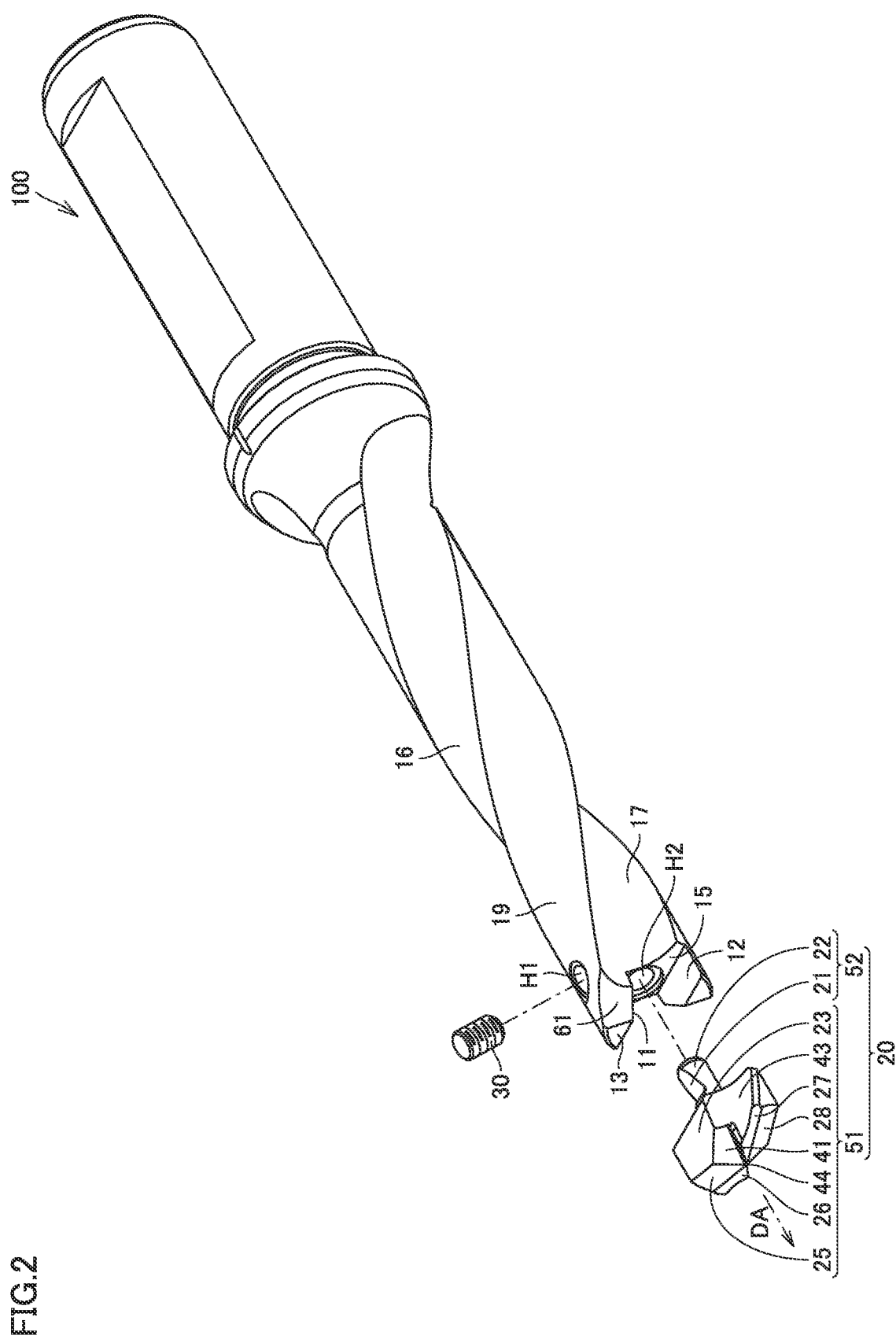
FIG. 2 is a schematic exploded perspective view showing the configuration of the cutting tool according to the first embodiment.

As shown in FIG. 1 and FIG. 2, cutting tool 100 according to the present embodiment is, for example, an indexable drill, and mainly includes a holder 10, a head 20, and a fastening portion 30. As shown in FIG. 2, a first hole H1 and a second hole H2 are provided in holder 10. Second hole H2 extends along a direction parallel to an axis line DA. First hole H1 extends in a direction inclined relative to a direction perpendicular to axis line DA. First hole H1 communicates with second hole H2. Head 20 includes a cutting edge portion 51 and a shank portion 52 configured to hold cutting edge portion 51. Shank portion 52 of head 20 is disposed inside second hole H2. Holder 10 has a first surface 11 and a second surface 12 provided to be separated from each other to sandwich axis line DA. Cutting edge portion 51 of head 20 is located between first surface 11 and second surface 12. Fastening portion 30 is disposed inside first hole H1.

Fastening portion 30 fixes head 20 to holder 10. At an outer circumferential surface of fastening portion 30, an external screw portion is formed, for example. On the other hand, at a surface defining first hole H1, an internal thread portion that can be engaged with the external screw portion is formed, for example. Fastening portion 30 is a clamp screw, for example. Fastening portion 30 is rotated using, for example, a driver in a fastening direction, thereby moving fastening portion 30 in first hole H1 in the direction toward second hole H2. By pressing the bottom surface of fastening portion 30 against a flat surface portion 21 provided at shank portion 52 of head 20, head 20 is fixed to holder 10. As shown in FIG. 1, head 20 has a tip 44 located forwardly of a first tip surface 13 of holder 10 in a direction parallel to axis line DA. It should be noted that axis line DA represents a rotation axis of the cutting tool when cutting a workpiece.

It should be noted that cutting tool 100 is not limited to the drill as long as cutting tool 100 is a rotary cutting tool capable of cutting a workpiece while rotating around axis line DA. Cutting tool 100 may be an indexable end mill, for example.

Next, the following describes details of a configuration of holder 10 according to the first embodiment.

Figure 3:
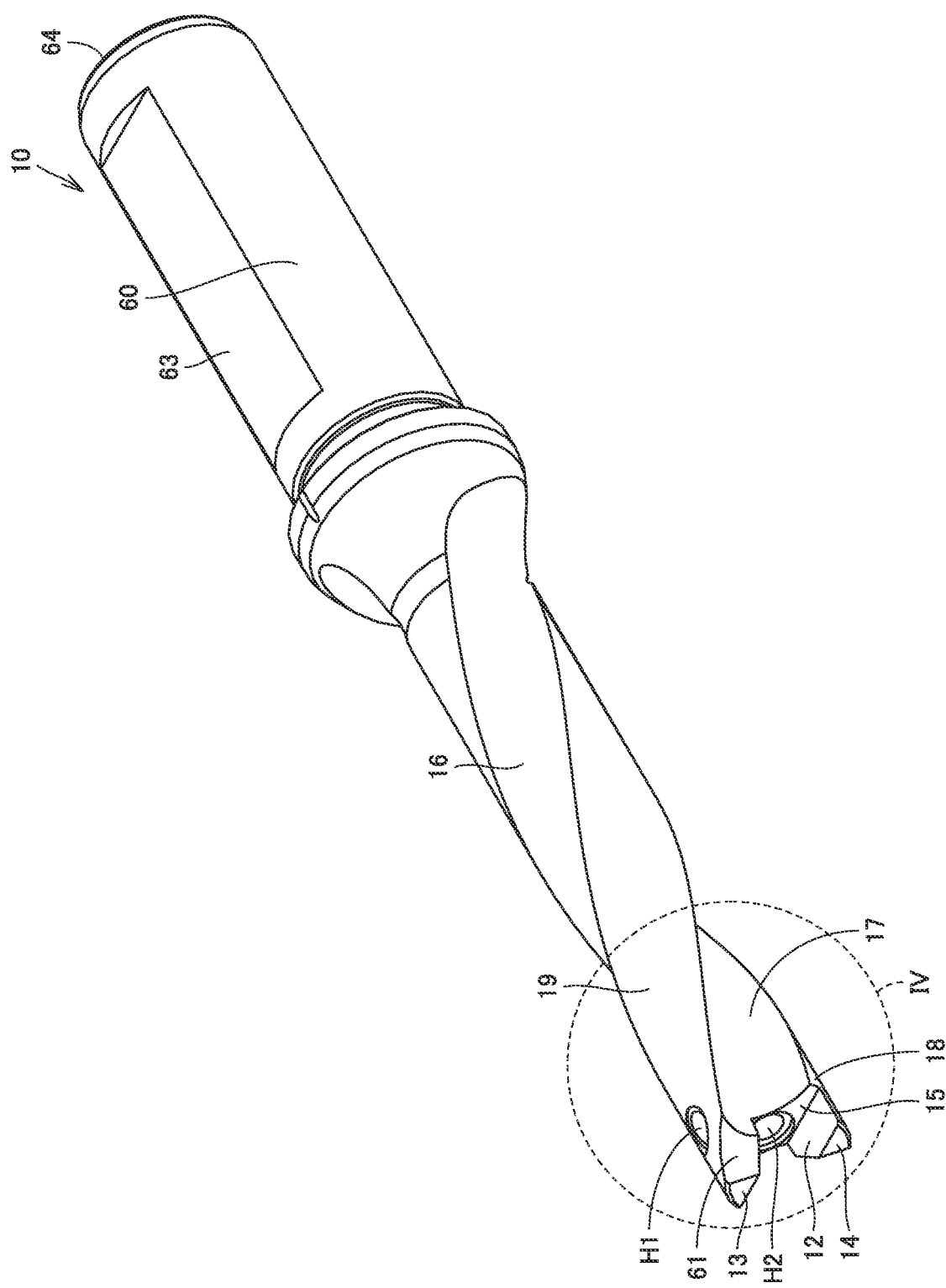
FIG. 3 is a schematic perspective view showing a configuration of a holder of the cutting tool according to the first embodiment.

As shown in FIG. 3 to FIG. 8, holder 10 mainly includes first surface 11, second surface 12, first tip surface 13, a second tip surface 14, a first inclined surface 61, a second inclined surface 62, a bottom surface 15, a first flute surface 17, a second flute surface 16, a first side surface 19, a second side surface 18, a holding portion 60, a flat portion 63, and a rear end surface 64. As shown in FIG. 3, first side surface 19 is continuous to both first flute surface 17 and second flute surface 16. In other words, first side surface 19 is located between first flute surface 17 and second flute surface 16 to connect first flute surface 17 and second flute surface 16. Similarly, second side surface 18 is continuous to both first flute surface 17 and second flute surface 16. In other words, second side surface 18 is located between first flute surface 17 and second flute surface 16 to connect first flute surface 17 and second flute surface 16. In the direction parallel to axis line DA, first tip surface 13 and second tip surface 14 are located at one side of holder 10 and rear end surface 64 is located at the other side of holder 10. Holding portion 60 is a portion to be engaged with a spindle of a machine tool.

Figure 4:
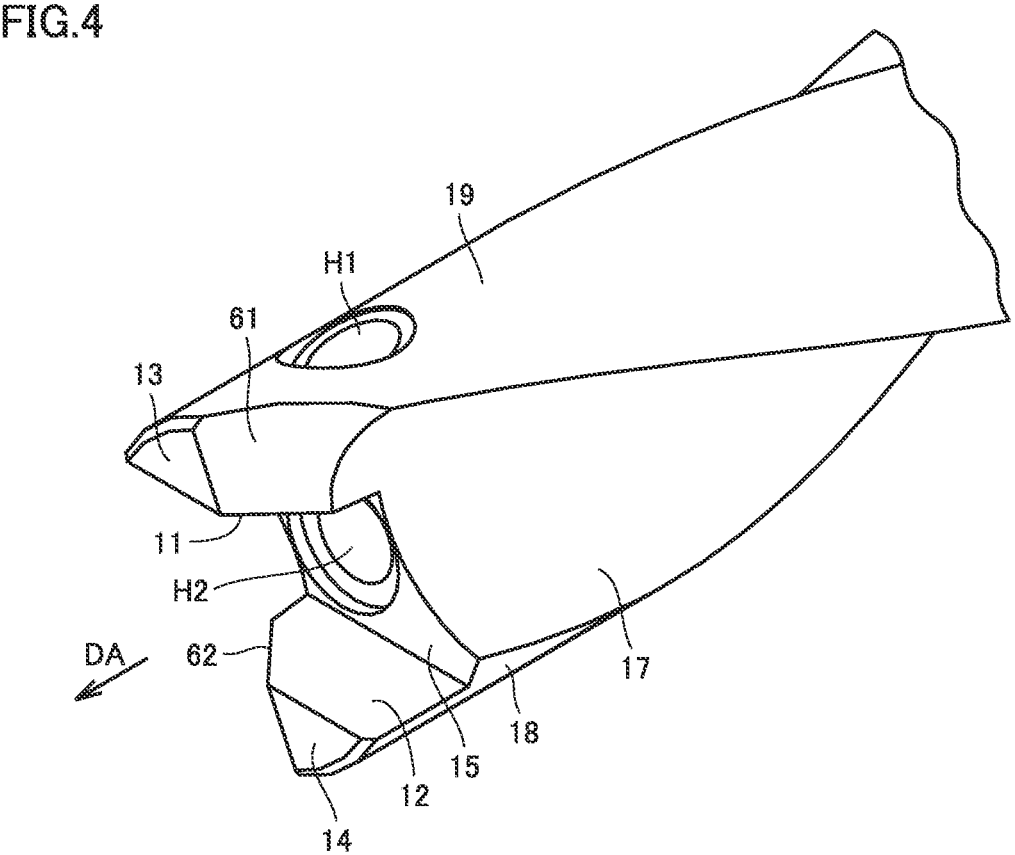
FIG. 4 is an enlarged view of a region IV of FIG. 3.
Figure 5:
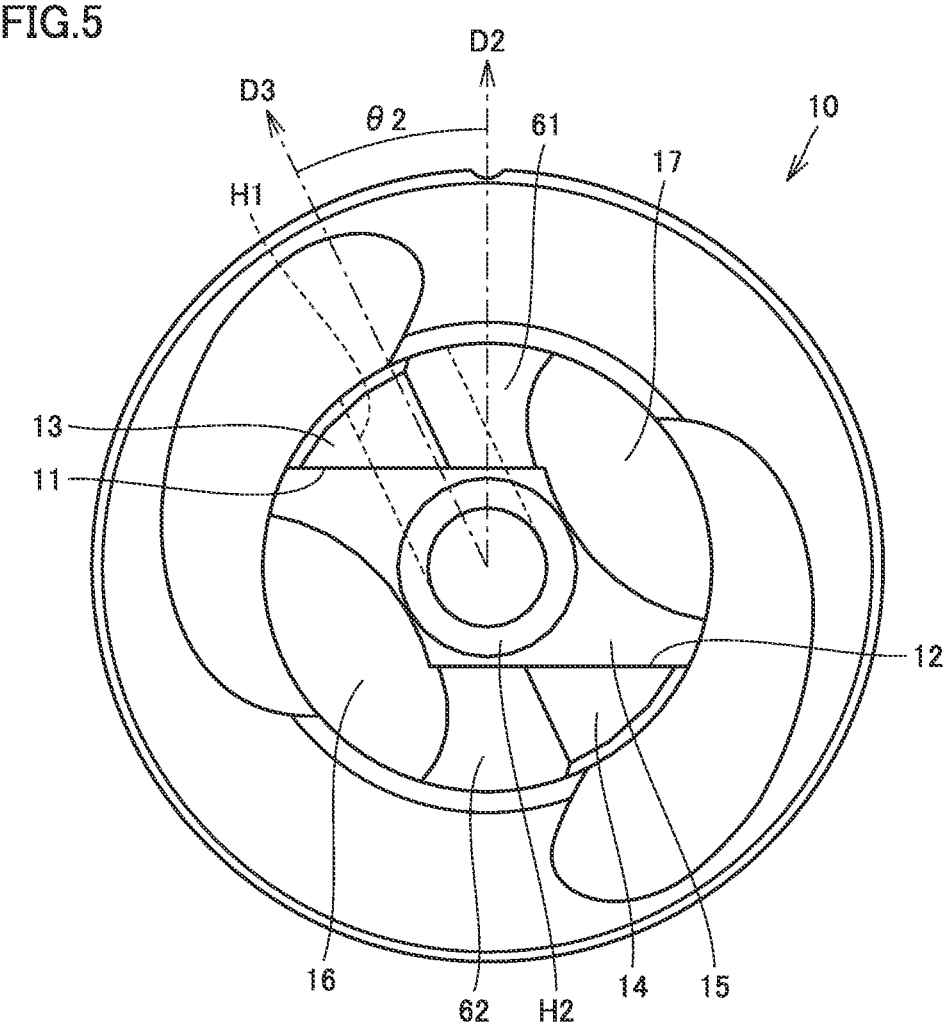
FIG. 5 is a schematic left side view showing the configuration of the holder of the cutting tool according to the first embodiment.

As shown in FIG. 4 and FIG. 5, first tip surface 13 is continuous to first surface 11. First inclined surface 61 is continuous to both first tip surface 13 and first surface 11. First inclined surface 61 is inclined relative to both first tip surface 13 and first surface 11. First inclined surface 61 is continuous to first flute surface 17. Similarly, second tip surface 14 is continuous to second surface 12. Second inclined surface 62 is continuous to both second tip surface 14 and second surface 12. Second inclined surface 62 is inclined relative to both second tip surface 14 and second surface 12. Second inclined surface 62 is continuous to second flute surface 16.

Figure 6:
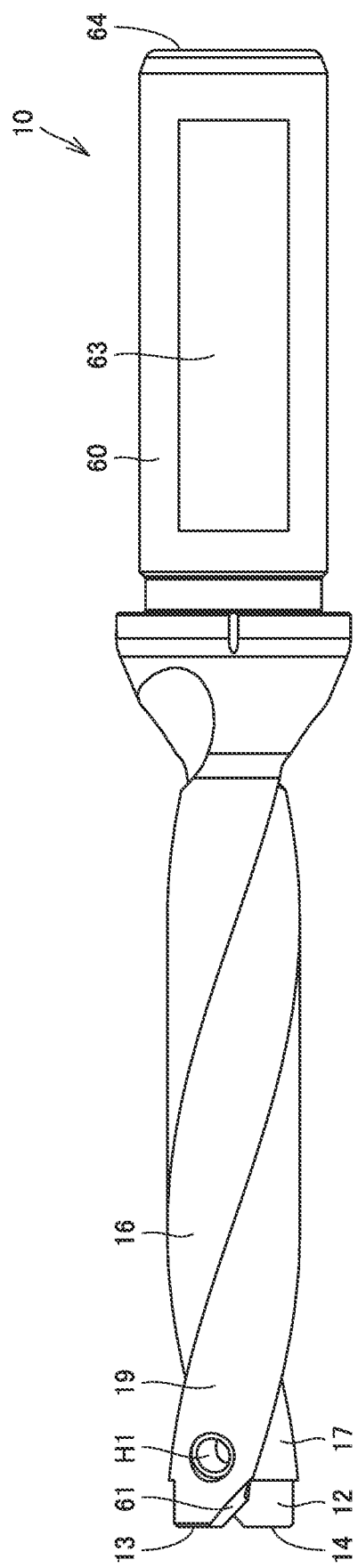
FIG. 6 is a schematic plan view showing the configuration of the holder of the cutting tool according to the first embodiment.
Figure 7:
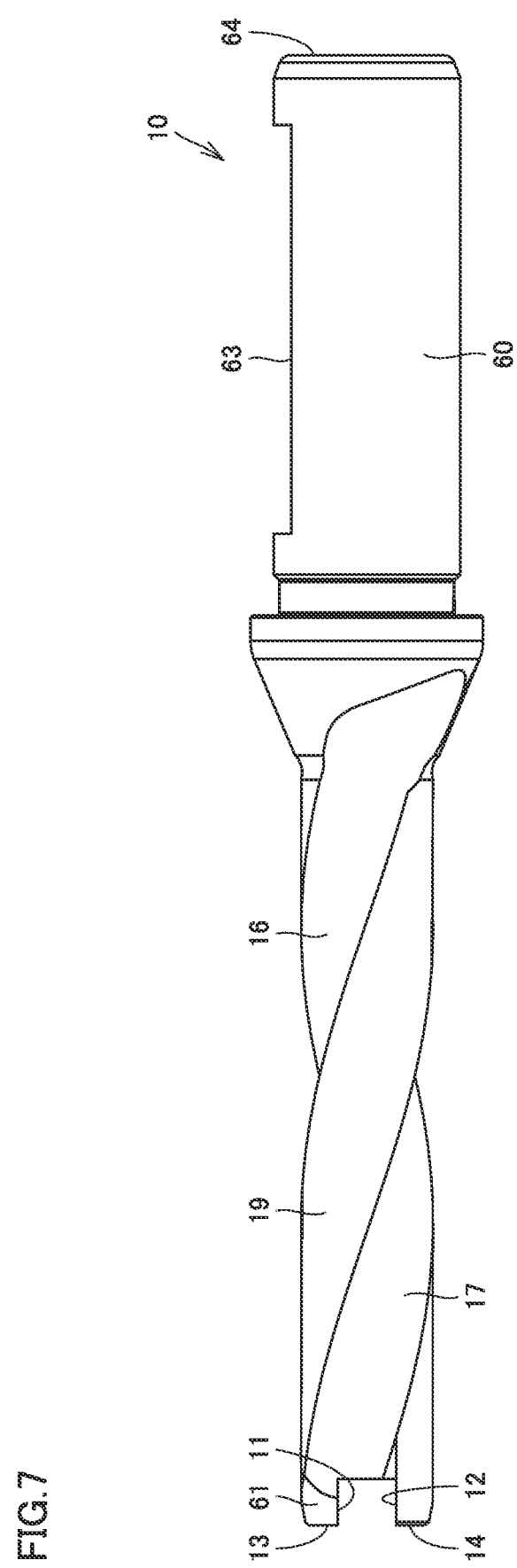
FIG. 7 is a schematic front view showing the configuration of the holder of the cutting tool according to the first embodiment.

As shown in FIG. 6 and FIG. 7, first tip surface 13 is substantially parallel to second tip surface 14. First tip surface 13 and second tip surface 14 are flat surfaces substantially perpendicular to axis line DA. As shown in FIG. 7, first tip surface 13 is a surface substantially perpendicular to first surface 11. Similarly, second tip surface 14 is a surface substantially perpendicular to second surface 12. When viewed from axis line DA, second side surface 18 is located opposite to first side surface 19. First flute surface 17 helically extends around axis line DA. Similarly, second flute surface 16 helically extends around axis line DA with second flute surface 16 being separated from first flute surface 17. When viewed from axis line DA, each of first side surface 19 and second side surface 18 is a curved surface protruding outwardly. On the other hand, when viewed from axis line DA, each of first flute surface 17 and second flute surface 16 is a curved surface protruding inwardly. First side surface 19 is continuous to first inclined surface 61. Similarly, second side surface 18 is continuous to first inclined surface 61.

Figure 8:
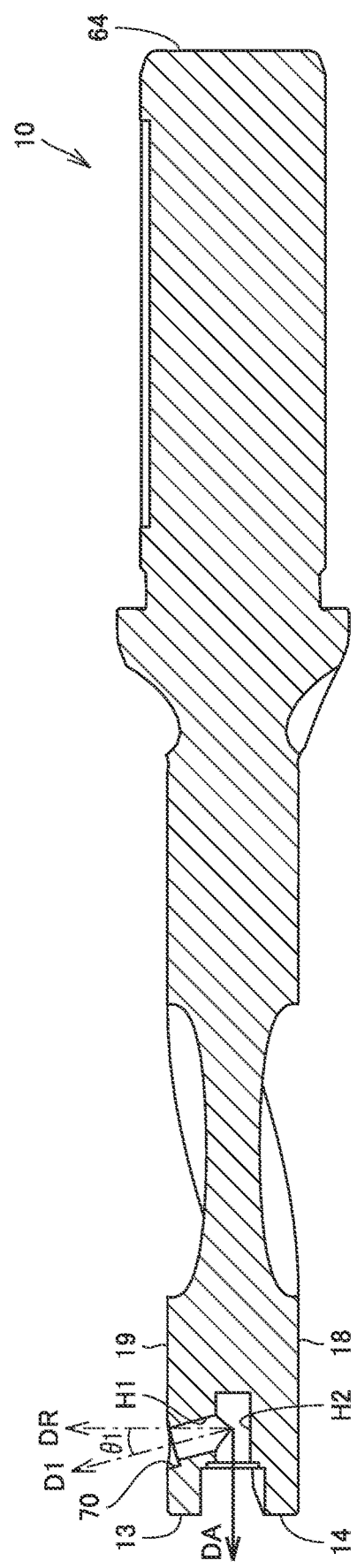
FIG. 8 is a schematic cross sectional view showing the configuration of the holder of the cutting tool according to the first embodiment, when viewed in a direction perpendicular to an axis line.

As shown in FIG. 4 and FIG. 6, first hole H1 is provided in first side surface 19 of holder 10. As shown in FIG. 8, first hole H1 extends in a first direction D1 inclined by a first angle θ1 in the direction toward cutting edge portion 51 (see FIG. 1) relative to a direction DR perpendicular to axis line DA. In other words, first direction D1 is inclined by first angle θ1 toward first tip surface 13 relative to direction DR perpendicular to axis line DA. First angle θ1 is, for example, more than or equal to 13°, and is preferably more than or equal to 15°. First angle θ1 may be, for example, less than or equal to 20°. First angle θ1 may be more than or equal to 12° and less than or equal to 18°. First direction D1 is also inclined relative to axis line DA. A recess 70 may be provided in first side surface 19 and first hole H1 may be provided in a bottom portion of recess 70.

As shown in FIG. 5, when viewed in the direction parallel to axis line DA, first hole H1 extends in a third direction D3 inclined by a second angle θ2 relative to a second direction D2 extending from second surface 12 toward first surface 11. In other words, when viewed in the direction parallel to axis line DA, third direction D3 is inclined by second angle θ2 toward first tip surface 13 relative to second direction D2. Preferably, second angle θ2 is more than or equal to 10° and less than or equal to 45°. Second angle θ2 may be more than or equal to 20°. Second angle θ2 may be less than or equal to 30° or may be less than or equal to 40°. When viewed in the direction parallel to axis line DA, first hole H1 is located between first flute surface 17 and second flute surface 16.

Next, the following describes details of a configuration of head 20 according to the first embodiment.

Figure 9:
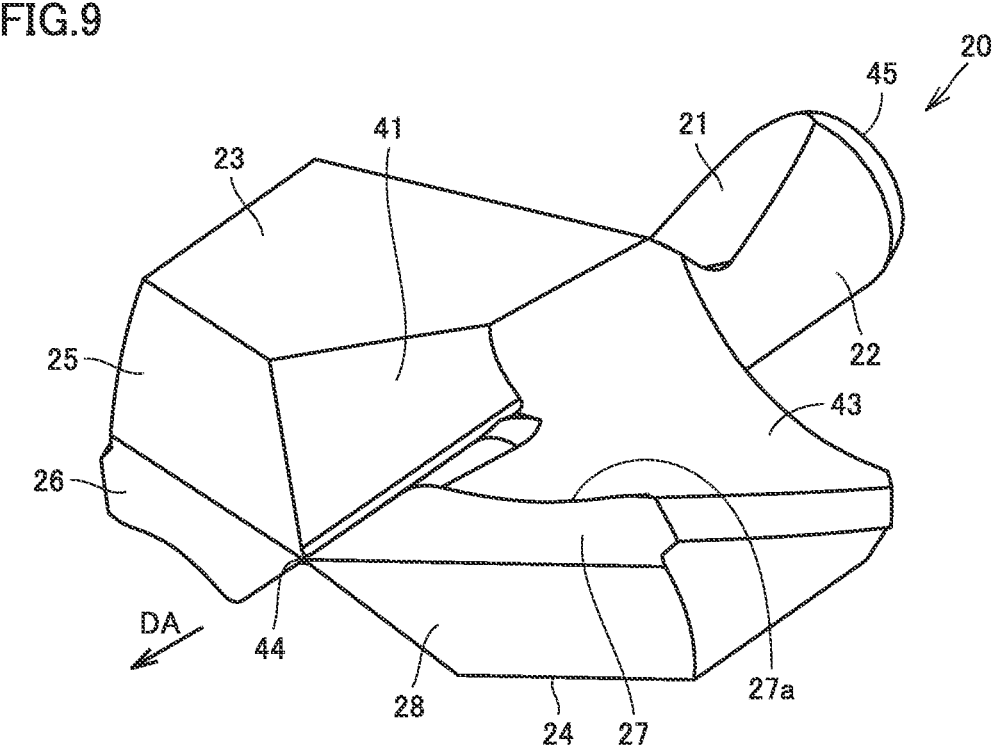
FIG. 9 is a schematic perspective view showing a configuration of a head of the cutting tool according to the first embodiment.
Figure 10:
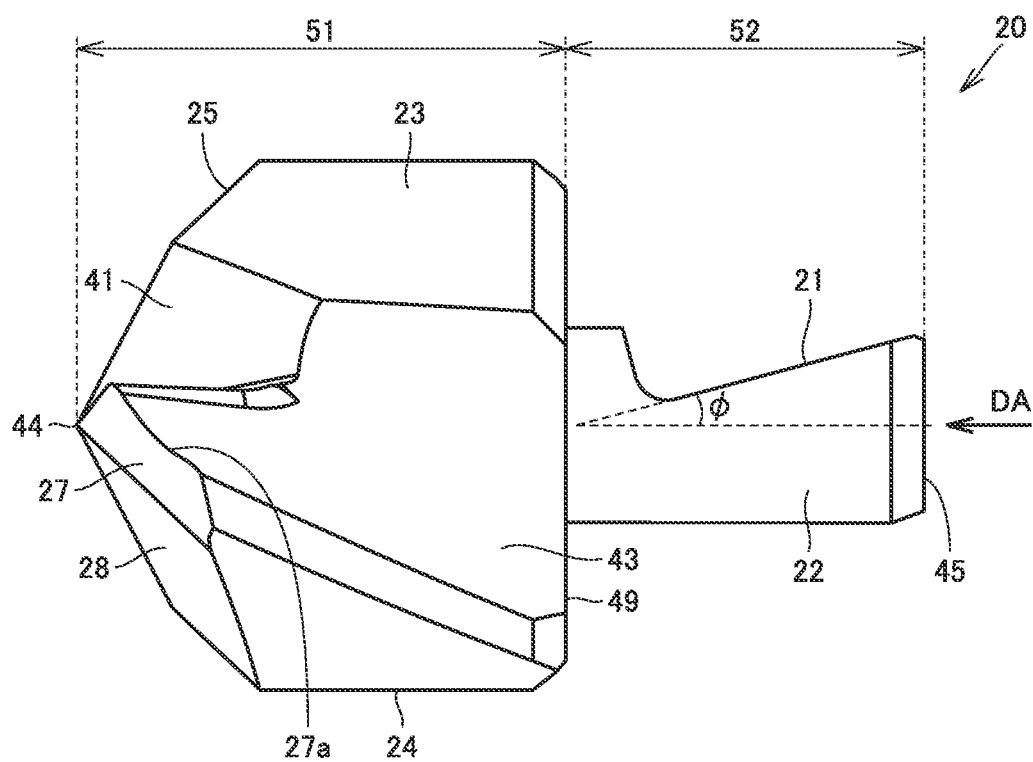
FIG. 10 is a schematic front view showing the configuration of the head of the cutting tool according to the first embodiment.
Figure 11:
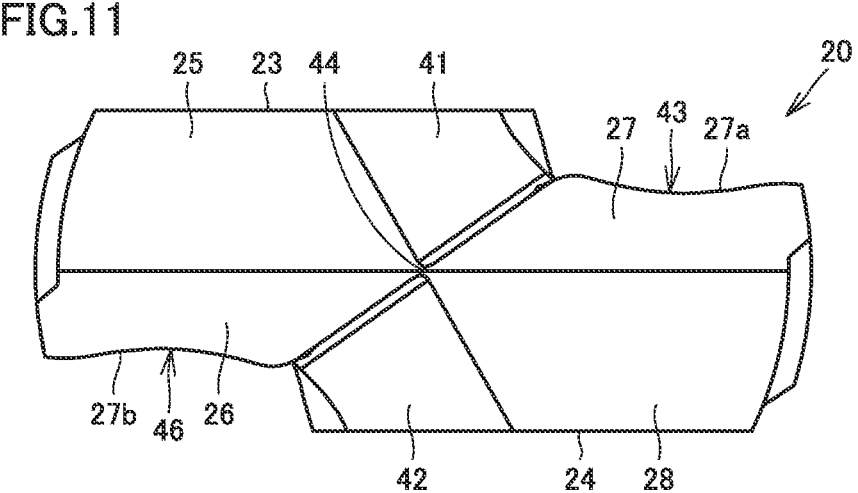
FIG. 11 is a schematic left side view showing the configuration of the head of the cutting tool according to the first embodiment.

As shown in FIG. 10, head 20 includes cutting edge portion 51 and shank portion 52 configured to hold cutting edge portion 51. As shown in FIG. 9 to FIG. 11, cutting edge portion 51 of head 20 mainly includes a third surface 23, a fourth surface 24, a first tip surface 25, a second tip surface 26, a third tip surface 27, a fourth tip surface 28, a fifth tip surface 41, a sixth tip surface 42, tip 44, a seating surface 49, a first rake face 43, and a second rake face 46. A ridgeline between first rake face 43 and third tip surface 27 defines a first cutting edge 27a. Similarly, a ridgeline between second rake face 46 and second tip surface 26 defines a second cutting edge 27b.

Shank portion 52 of head 20 mainly has flat surface portion 21, a curved surface portion 22, and a rear end portion 45. Shank portion 52 is in contact with cutting edge portion 51 at seating surface 49. A cross sectional shape of shank portion 52 at seating surface 49 is circular, for example. Shank portion 52 extends in the direction of axis line DA of head 20. Axis line DA represents the rotation axis of head 20. As shown in FIG. 10, when viewed in the direction parallel to flat surface portion 21 and perpendicular to axis line DA, flat surface portion 21 is inclined by an angle φ relative to axis line DA. Angle φ is substantially the same as first angle θ1. Angle φ is, for example, more than or equal to 13°, and is preferably more than or equal to 15°. Angle φ may be less than or equal to 20°, for example. Angle φ may be more than or equal to 12° and less than or equal to 18°. When head 20 is attached to holder 10, flat surface portion 21 faces first hole H1 provided in holder 10.

As shown in FIG. 9 to FIG. 11, third surface 23 and fourth surface 24 are separated from each other to sandwich axis line DA. Third surface 23 and fourth surface 24 face each other. Third surface 23 is substantially parallel to fourth surface 24. As shown in FIG. 9 and FIG. 10, third surface 23 is continuous to first tip surface 25, fifth tip surface 41, and first rake face 43. Similarly, fourth surface 24 is continuous to fourth tip surface 28, sixth tip surface 42, and second rake face 46. Second tip surface 26 is separated from both third surface 23 and fourth surface 24. Similarly, third tip surface 27 is separated from both third surface 23 and fourth surface 24. First tip surface 25 extends in a direction crossing both third surface 23 and fifth tip surface 41. Similarly, fourth tip surface 28 extends in a direction crossing both fourth surface 24 and sixth tip surface 42.

Next, the following describes a method of attaching head 20 to holder 10.

Figure 12:
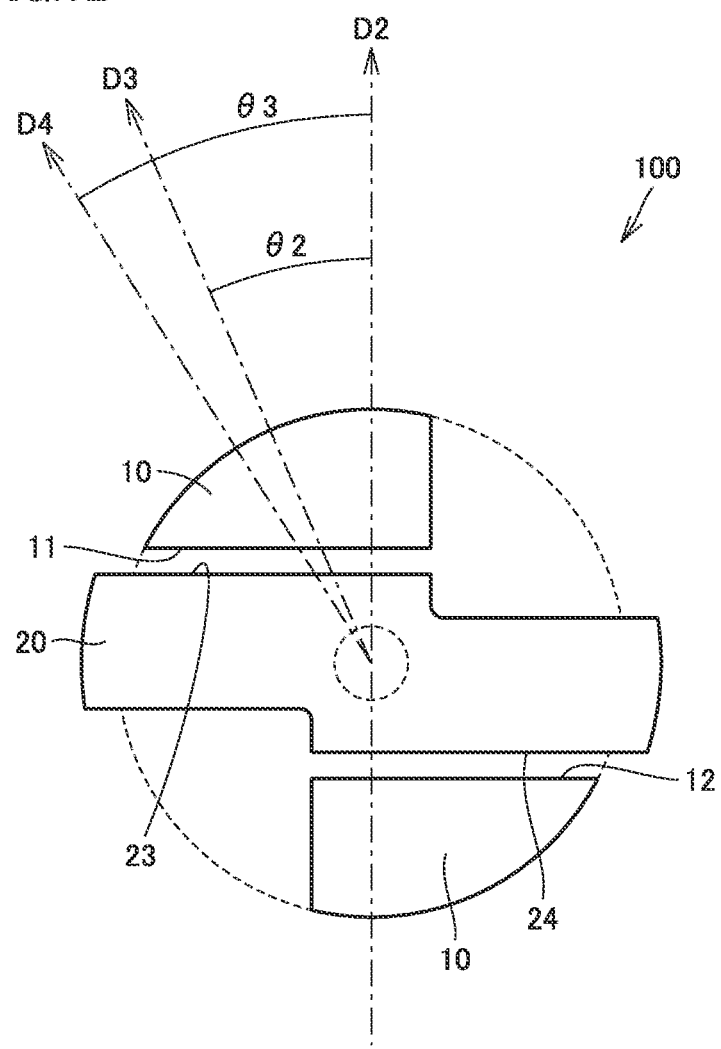
FIG. 12 is a schematic left side view showing a positional relation between the head and the holder before clamping.

As shown in FIG. 1 and FIG. 2, shank portion 52 of head 20 is inserted into second hole H2 of holder 10. Seating surface 49 of head 20 is in contact with bottom surface 15 of holder 10. As shown in FIG. 12, third surface 23 of head 20 faces first surface 11 of holder 10. Fourth surface 24 of the head faces second surface 12 of holder 10. Cutting edge portion 51 of head 20 is disposed in a space between first surface 11 and second surface 12.

As shown in FIG. 5 and FIG. 12, third direction D3 is the direction in which first hole H1 extends. A fourth direction D4 is a direction perpendicular to flat surface portion 21 of head 20. In a plane (field of view of FIG. 12) perpendicular to axis line DA, a third angle θ3 between second direction D2 and fourth direction D4 perpendicular to flat surface portion 21 is larger than second angle θ2 between second direction D2 and third direction D3. Third angle θ3 is less than 90°. Third angle θ3 is more than or equal to 10° and less than or equal to 30°, for example. A value obtained by subtracting second angle θ2 from third angle θ3 is, for example, less than or equal to 5°, and is preferably less than or equal to 1°.

Figure 13:
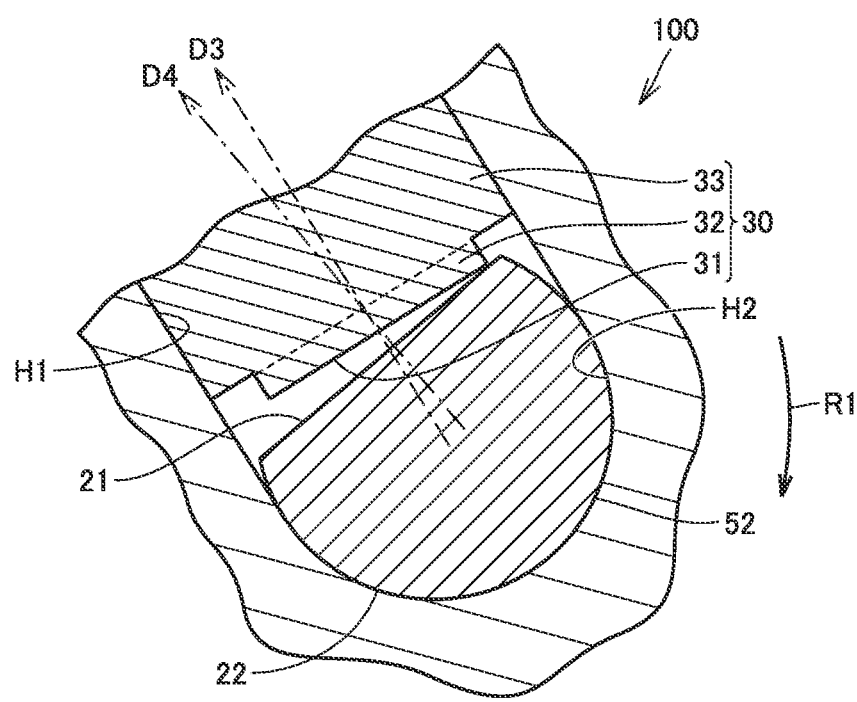
FIG. 13 is a schematic cross sectional view showing a positional relation among the head, the holder, and a fastening portion before clamping, when viewed in the direction parallel to the axis line.

As shown in FIG. 13, fastening portion 30 mainly includes a main body portion 33, a tip 32, and a contact surface 31. The diameter of main body portion 33 is substantially the same as that of first hole H1. An external screw is formed at main body portion 33, for example. Main body portion 33 is in contact with the side surface defining first hole H1. Tip 32 has a diameter smaller than that of main body portion 33. Tip 32 may be separated from the side surface defining first hole H1. Contact surface 31 is in contact with flat surface portion 21 of head 20. As shown in FIG. 13, fastening portion 30 is provided inside first hole H1. A portion of tip 32 of fastening portion 30 may be located inside second hole H2.

When fastening portion 30 is moved in a direction toward shank portion 52 of head 20, contact surface 31 of fastening portion 30 is brought into contact with a portion of flat surface portion 21 of head 20. When fastening portion 30 is further moved in the direction toward head 20, rotation force is exerted to head 20. Head 20 is rotated around axis line DA in a rotation direction R1.

Figure 14:
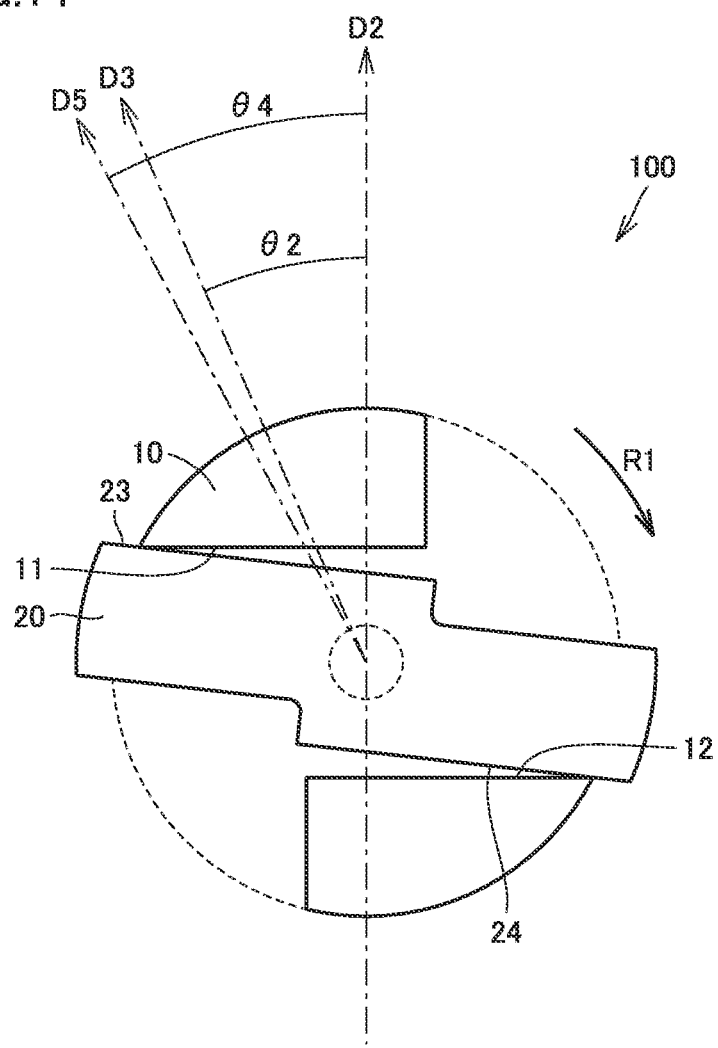
FIG. 14 is a schematic left side view showing a positional relation between the head and the holder after clamping.

As shown in FIG. 14, when head 20 is rotated in rotation direction R1, third surface 23 of head 20 is pressed against first surface 11 of holder 10. Similarly, fourth surface 24 of head 20 is pressed against second surface 12 of holder 10. Accordingly, head 20 is fixed to first surface 11, second surface 12, and bottom surface 15 of holder 10 while drawing head 20 into second hole H2 from first tip surface 13 and second tip surface 14 toward rear end surface 64 of holder 10. In this state, a workpiece is cut. It should be noted that the rotation direction of head 20 during the cutting is a direction opposite to rotation direction R1.

As shown in FIG. 14, after fixing head 20 to holder 10 by fastening portion 30, a fourth angle θ4 between second direction D2 and a fifth direction D5 perpendicular to flat surface portion 21 of head 20 is smaller than third angle θ3 in the plane perpendicular to axis line DA (see FIG. 12). After fixing head 20 to holder 10 by fastening portion 30, first surface 11 may be inclined relative to third surface 23. Similarly, second surface 12 may be inclined relative to fourth surface 24.

Figure 15:
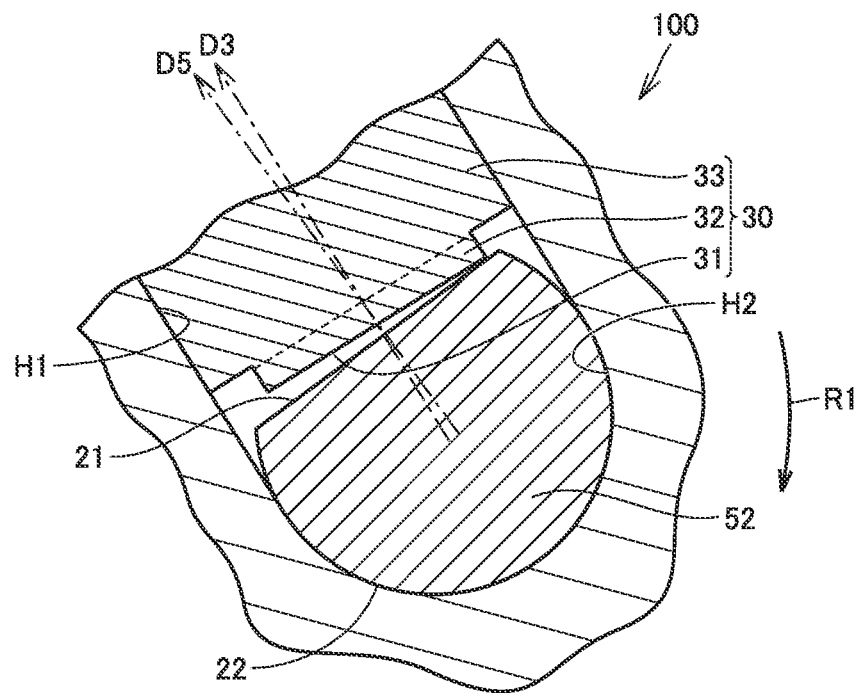
FIG. 15 is a schematic cross sectional view showing a positional relation among the head, the holder, and the fastening portion after clamping, when viewed in the direction parallel to the axis line.

As shown in FIG. 15, after completing fastening by fastening portion 30, a portion of contact surface 31 may be separated from flat surface portion 21. For example, more than or equal to 50% of the area of contact surface 31 may be in contact with flat surface portion 21, more than or equal to 90% of the area of contact surface 31 may be in contact with flat surface portion 21, or contact surface 31 may be entirely in contact with flat surface portion 21.

Next, the following describes function and effect of the cutting tool according to the first embodiment.

According to cutting tool 100 according to the first embodiment, holder 10 is provided with first hole H1 extending in first direction D1 inclined by first angle θ1 toward cutting edge portion 51 relative to the direction perpendicular to axis line DA. Fastening portion 30 is provided inside first hole H1 and is in contact with flat surface portion 21 of shank portion 52 of head 20. Fastening portion 30 presses flat surface portion 21 of shank portion 52, thereby drawing shank portion 52 into second hole H2 of holder 10. Moreover, when viewed in the direction parallel to axis line DA, the extending direction of first hole H1 is third direction D3 inclined by second angle θ2 relative to second direction D2 extending from first surface 11 toward second surface 12, and third angle θ3 between second direction D2 and fourth direction D4 perpendicular to flat surface portion 21 is larger than second angle θ2. Accordingly, flat surface portion 21 can be provided with torque in the rotation direction with axis line DA serving as the rotation axis. As a result, third surface 23 of head 20 can be pressed against first surface 11 of holder 10 and fourth surface 24 of head 20 can be pressed against second surface 12 of holder 10. That is, when aligning head 20 with the center of holder 10 and fixing head 20 to holder 10 by fastening portion 30, head 20 is rotated by a very small amount, is drawn to the holder 10 side and can be fixed to holder 10 firmly and precisely using bottom surface 31 of fastening portion 30.

Moreover, according to cutting tool 100 according to the first embodiment, first angle θ1 is more than or equal to 13°. Accordingly, shank portion 52 of head 20 can be drawn effectively into second hole H2 of holder 10.

Further, according to cutting tool 100 according to the first embodiment, second angle θ2 is more than or equal to 10° and less than or equal to 45°.

Further, according to cutting tool 100 according to the first embodiment, the value obtained by subtracting second angle θ2 from third angle θ3 is less than or equal to 5°. Accordingly, when fastening portion 30 is fastened, torque in the rotation direction can be applied effectively to flat surface portion 21. As a result, head 20 can be fixed to holder 10 more firmly and more precisely.

Second Embodiment

Next, the following describes a configuration of a cutting tool 100 according to a second embodiment. The configuration of cutting tool 100 according to the second embodiment is different from the configuration of the first embodiment in that a minimum distance from axis line DA to first surface 11 is longer than a minimum distance from axis line DA to second surface 12. The other configurations are substantially the same as those of the first embodiment. Hence, in the description below, the difference from the configuration of the first embodiment will be mainly described.

Figure 16:
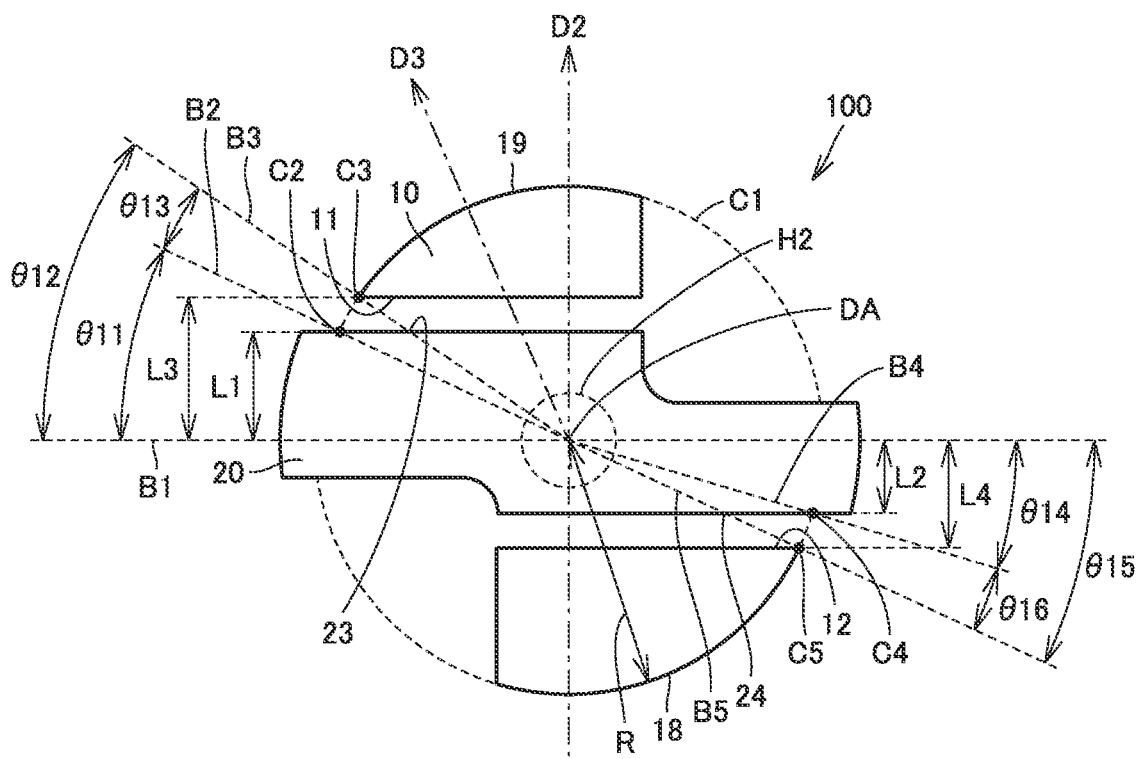
FIG. 16 is a schematic left side view showing a configuration of a cutting tool according to a second embodiment.

As shown in FIG. 16, in head 20 according to the second embodiment, in the direction extending from third surface 23 toward fourth surface 24, a distance L1 from axis line DA to third surface 23 is longer than a distance L2 from axis line DA to fourth surface 24. In holder 10 according to the second embodiment, in the direction extending from first surface 11 toward second surface 12, a minimum distance L3 between first surface 11 and axis line DA may be longer than a minimum distance L4 between second surface 12 and axis line DA. That is, when viewed in the direction parallel to axis line DA, minimum distance L3 between first surface 11 and axis line DA is longer than minimum distance L4 between second surface 12 and axis line DA, and minimum distance L1 between third surface 23 and axis line DA may be longer than minimum distance L2 between fourth surface 24 and axis line DA. Minimum distance L1 is 2.18 mm, for example. Minimum distance L2 is 1.68 mm, for example. Preferably, a value obtained by subtracting minimum distance L2 from minimum distance L1 is less than or equal to 1.0 mm. Preferably, a value obtained by subtracting minimum distance L4 from minimum distance L3 is less than or equal to 1.0 mm. First hole H1 is provided in first side surface 19.

As shown in FIG. 16, it is assumed that a straight line B1 represents a straight line perpendicular to both second direction D2 and the direction of axis line DA. Straight line B1 is in parallel with both first surface 11 and second surface 12, for example. Similarly, straight line B1 is in parallel with both third surface 23 and fourth surface 24, for example. In the plane perpendicular to axis line DA, a distance between axis line DA and second side surface 18 corresponds to radius R of holder 10. A circle C1 having radius R and centering on axis line DA is assumed. It is assumed that a straight line B2 represents a straight line that connects axis line DA and a contact point C2 between circle C1 and third surface 23. Similarly, it is assumed that a straight line B3 represents a straight line that connects axis line DA and a contact point C3 between circle C1 and first surface 11. Contact point C3 may be a contact point between first surface 11 and first side surface 19.

Minimum distance L1 is the same as a minimum distance between contact point C2 and straight line B1. Minimum distance L3 is the same as a minimum distance between contact point C3 and straight line B1. An angle θ11 between straight line B1 and straight line B2 in the plane perpendicular to axis line DA is expressed by the following formula 1. An angle θ12 between straight line B1 and straight line B3 in the plane perpendicular to axis line DA is expressed by the following formula 2. An angle θ13 is expressed by the following formula 3.

$$\theta 11 = \arcsin\left(\frac{L1}{R}\right) \times \frac{180}{\pi} \quad \text{[Formula 1]}$$

$$\theta 12 = \arcsin\left(\frac{L3}{R}\right) \times \frac{180}{\pi} \quad \text{[Formula 2]}$$

$$\theta 13 = \theta 12 - \theta 11 \quad \text{[Formula 3]}$$

As shown in FIG. 16, it is assumed that a straight line B4 represents a straight line that connects axis line DA and a contact point C4 between circle C1 and fourth surface 24. Similarly, it is assumed that a straight line B5 represents a straight line that connects axis line DA and a contact point C5 between circle C1 and second surface 12. Minimum distance L2 is the same as the minimum distance between contact point C4 and straight line B1. Minimum distance L4 is the same as the minimum distance between contact point C5 and straight line B1. An angle θ14 between straight line B1 and straight line B4 in the plane perpendicular to axis line DA is expressed by the following formula 4. An angle θ15 between straight line B1 and straight line B5 in the plane perpendicular to axis line DA is expressed by the following formula 5. An angle θ16 is expressed by the following formula 6.

$$\theta 14 = \arcsin\left(\frac{L2}{R}\right) \times \frac{180}{\pi} \quad \text{[Formula 4]}$$

$$\theta 15 = \arcsin\left(\frac{L4}{R}\right) \times \frac{180}{\pi} \quad \text{[Formula 5]}$$

$$\theta 16 = \theta 15 - \theta 14 \quad \text{[Formula 6]}$$

A smaller absolute value of the difference between angle θ13 and angle θ16 is more preferable. The absolute value of the difference between angle θ13 and angle θ16 preferably corresponds to less than or equal to 30 seconds. It should be noted that 1 second corresponds to 1/3600°. Angle θ13 may be smaller than or the same as the value (see FIG. 12) obtained by subtracting angle θ2 from angle θ3. Similarly, angle θ16 may be smaller than or the same as the value (see FIG. 12) obtained by subtracting angle θ2 from angle θ3.

Next, the following describes function and effect of the cutting tool according to the second embodiment.

According to cutting tool 100 according to the second embodiment, cutting edge portion 51 includes third surface 23 facing first surface 11, and fourth surface 24 facing second surface 12. When viewed in the direction parallel to axis line DA, minimum distance L3 between first surface 11 and axis line DA is longer than minimum distance L4 between second surface 12 and axis line DA, and minimum distance L1 between third surface 23 and axis line DA is longer than minimum distance L2 between fourth surface 24 and axis line DA. When minimum distance L3 is the same as minimum distance L4 and minimum distance L1 is the same as minimum distance L2, head 20 can be fixed to holder 10 such that third surface 23 of head 20 faces first surface 11 of holder 10 and fourth surface 24 of head 20 faces second surface 12 of holder 10, or conversely, head 20 can be fixed to holder 10 such that third surface 23 of head 20 faces second surface 12 of holder 10 and fourth surface 24 of head 20 faces first surface 11 of holder 10. Meanwhile, since first hole H1 is formed only at the first surface 11 side of holder 10, flat surface portion 21 of head 20 is not in abutment with fastening portion 30 if head 20 is conversely attached. In particular, head 20 may be attached to holder 10 under a circumstance involving a difficulty in visual observation thereof. By configuring holder 10 and head 20 as in the present embodiment, head 20 can be prevented from being attached to holder 10 in a wrong direction. Moreover, the thickness of the portion of holder 10 at the first surface 11 side at which first hole H1 is formed is smaller than the thickness of the portion of holder 10 at the second surface 12 side at which first hole H1 is not formed. Accordingly, the rigidity of the portion of holder 10 at the first surface 11 side at which first hole H1 is formed can be maintained to be high.

Third Embodiment

Next, the following describes a configuration of a cutting tool 100 according to a third embodiment. The configuration of cutting tool 100 according to the third embodiment is different from the configuration of the first embodiment in that a coolant passage groove 48 is provided in the cutting edge portion of head 20 and a swaging prevention groove 47 is provided in the shank portion of head 20. The other configurations are substantially the same as those of the first embodiment. Hence, in the description below, the difference from the configuration of the first embodiment will be mainly described.

Figure 17:
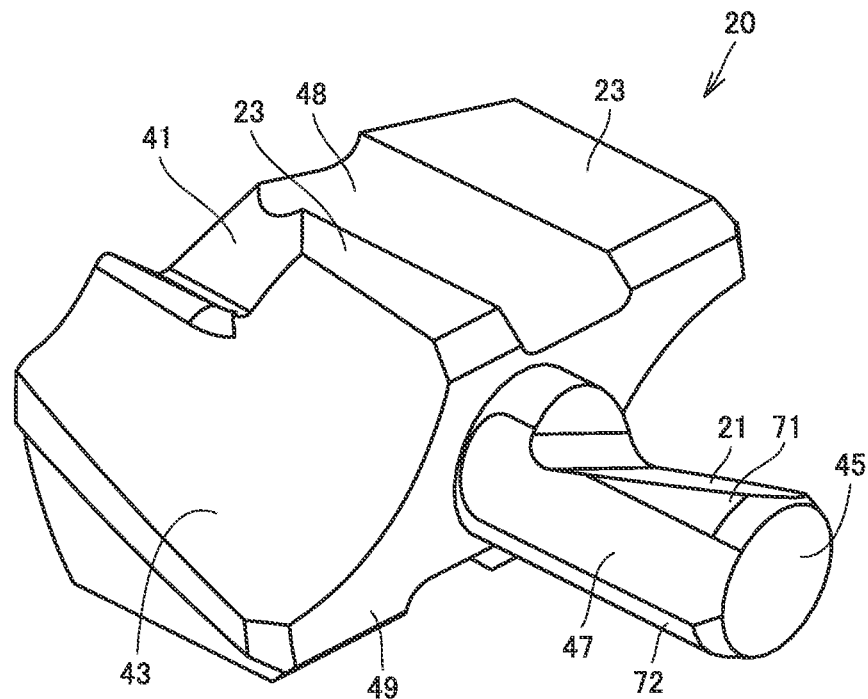
FIG. 17 is a schematic perspective view showing a configuration of a head of a cutting tool according to a third embodiment.

As shown in FIG. 17, shank portion 52 of head 20 according to the third embodiment is provided with a contact portion 72, swaging prevention groove 47, and a curved surface portion 71. Contact portion 72 is located opposite to flat surface portion 21. Swaging prevention groove 47 is located between flat surface portion 21 and contact portion 72. Swaging prevention groove 47 may be a cutout provided in shank portion 52. Swaging prevention groove 47 is a flat surface, for example. Swaging prevention groove 47 may extend in the direction parallel to axis line DA. The normal line of swaging prevention groove 47 may be substantially perpendicular to axis line DA. Swaging prevention groove 47 may extend to rear end portion 45. Contact portion 72 is a curved surface, for example. Curved portion 71 connects flat surface portion 21 and swaging prevention groove 47.

Figure 21:
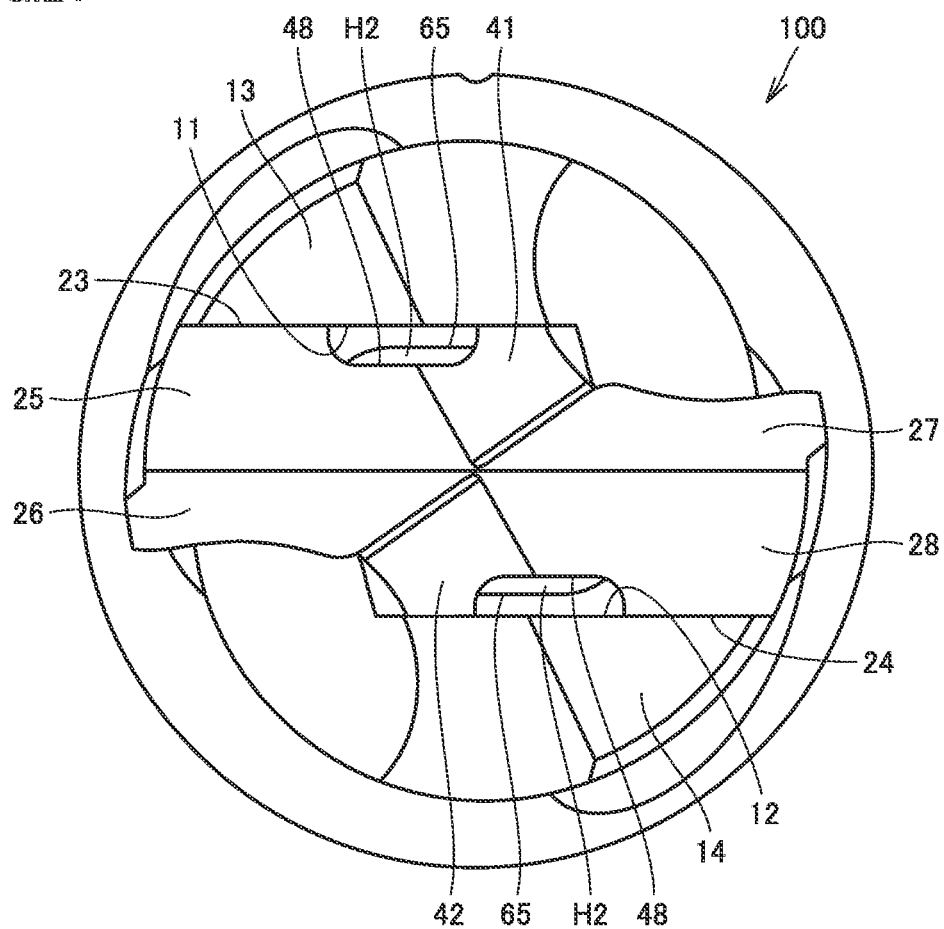
FIG. 21 is a schematic left side view showing the configuration of the cutting tool according to the third embodiment.

Coolant passage groove 48 may be provided in third surface 23 of cutting edge portion 51. As shown in FIG. 17 and FIG. 21, coolant passage groove 48 extends from seating surface 49 to first tip surface 25. Coolant passage groove 48 may extend to seating surface 49, first tip surface 25, and fifth tip surface 41. The longitudinal direction of coolant passage groove 48 may be the direction parallel to axis line DA. As shown in FIG. 21, coolant passage groove 48 may be provided also in fourth surface 24. Coolant passage groove 48 may extend to fourth tip surface 28 and sixth tip surface 42.

Figure 18:
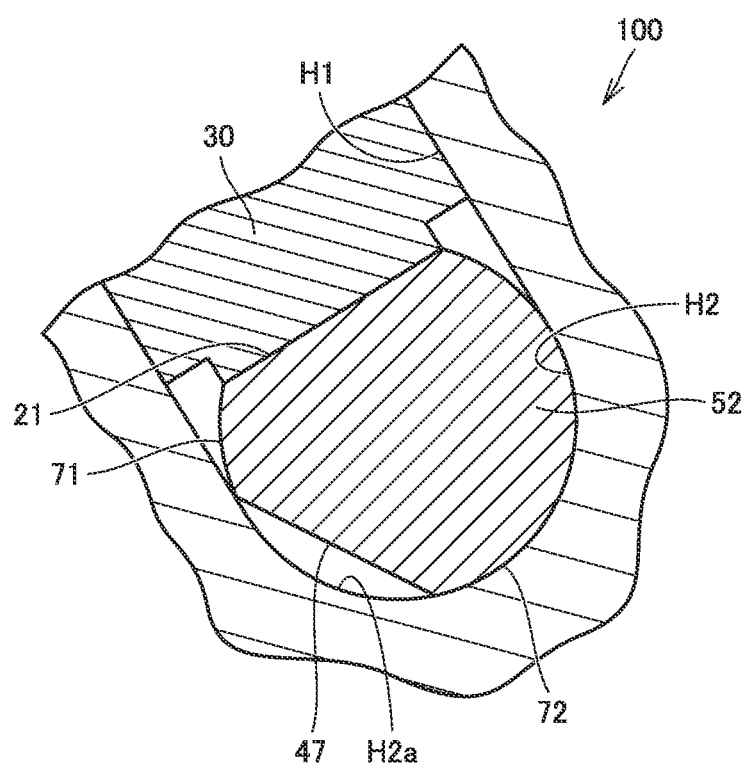
FIG. 18 is a schematic cross sectional view showing the configuration of the cutting tool according to the third embodiment, when viewed in the direction parallel to the axis line.

As shown in FIG. 18, contact portion 72 of shank portion 52 is in contact with the surface of holder 10 defining second hole H2. On the other hand, swaging prevention groove 47 is separated from surface H2a of holder 10 defining second hole H2. It may be configured to permit the coolant to pass through a space between swaging prevention groove 47 and surface H2a. Curved portion 71 may be separated from the surface of holder 10 defining second hole H2.

Figure 19:
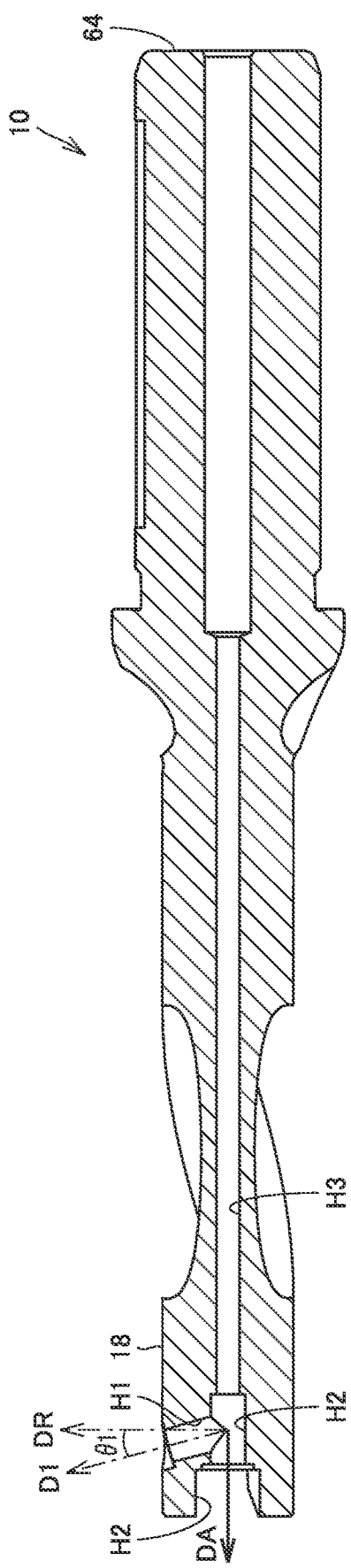
FIG. 19 is a schematic cross sectional view showing a configuration of a holder of the cutting tool according to the third embodiment, when viewed in the direction perpendicular to the axis line.

As shown in FIG. 19, a coolant feed passage H3 may be provided in holder 10 according to the third embodiment. Coolant feed passage H3 extends along axis line DA of holder 10. One end of coolant feed passage H3 may be opened at rear end surface 64 of holder 10. The other end of coolant feed passage H3 may communicate with second hole H2. That is, second hole H2 is configured to function as a coolant feed passage.

Figure 20:
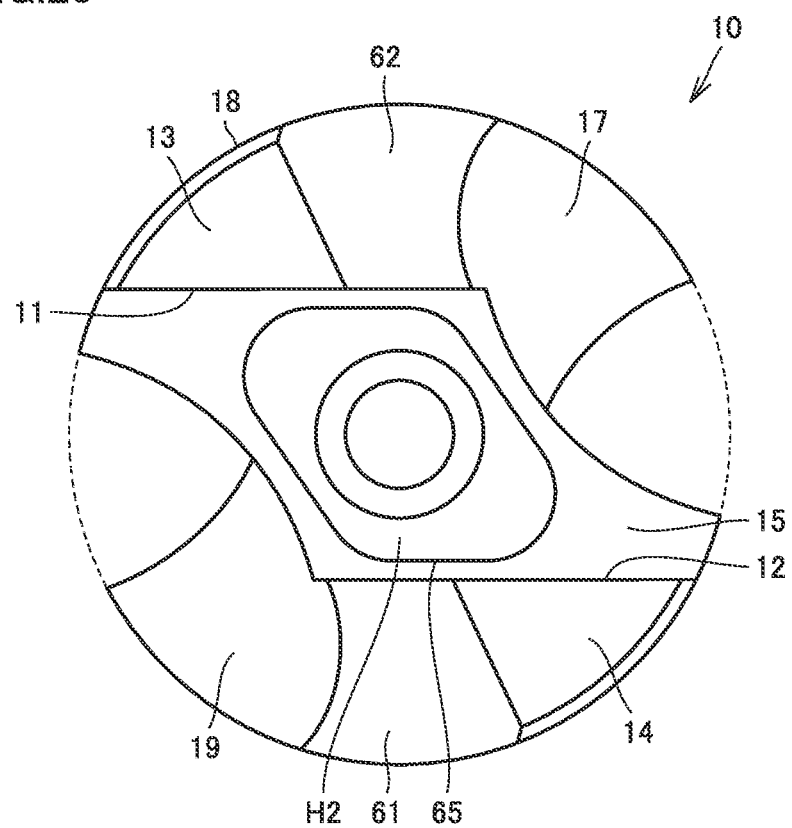
FIG. 20 is a schematic left side view showing the configuration of the holder of the cutting tool according to the third embodiment.

As shown in FIG. 20, when viewed in the direction parallel to axis line DA, the area of opening 65 of second hole H2 serving as a portion of the coolant feed passage may be larger than the area of the portion of second hole H2 communicating with first hole H1. Opening 65 is formed in bottom surface 15. Opening 65 may have a straight line portion parallel to first surface 11, and a straight line portion parallel to second surface 12.

As shown in FIG. 21, when viewed in the direction parallel to axis line DA, opening 65 of coolant feed passage H3 is exposed from coolant passage groove 48 provided in head 20 when shank portion 52 of head 20 is inserted into second hole H2 of holder 10. In other words, when viewed in the direction parallel to axis line DA, most of opening 65 is overlapped with head 20 but a portion of opening 65 is not overlapped with head 20. Accordingly, the coolant flows from coolant feed passage H3 into second hole H2, passes through the space between swaging prevention groove 47 and surface H2a, and reaches opening 65 of second hole H2. Next, the coolant is sent out forwardly of head 20 from opening 65, which is exposed from head 20, through coolant passage groove 48.

The following describes function and effect of the cutting tool according to the third embodiment.

According to cutting tool 100 according to the third embodiment, shank portion 52 has contact portion 72 opposite to flat surface portion 21, and is provided with swaging prevention groove 47 located between flat surface portion 21 and contact portion 72. If the space between shank portion 52 and second hole H2 is small, shank portion 52 may become unable to be removed from second hole H2 once shank portion 52 is inserted in second hole H2. By providing swaging prevention groove 47 in shank portion 52, shank portion 52 can be prevented from being unable to be removed from second hole H2.

Moreover, according to cutting tool 100 according to the third embodiment, coolant feed passage H3 may be provided in holder 10. When viewed in the direction parallel to axis line DA, opening 65 of coolant feed passage H3 may be exposed from groove 48 provided in cutting edge portion 51. Swarf is normally discharged to outside via the flute portion. Hence, for example, if the opening of coolant feed passage H3 is formed in the flute portion, the coolant sent out from the opening is blocked by the swarf, with the result that the contact portion between the cutting edge portion and the workpiece cannot be cooled effectively. On the other hand, in the case of the third embodiment, the coolant can be supplied forwardly of cutting edge portion 51. Accordingly, the contact portion between the cutting edge portion and the workpiece can be cooled effectively.

Fourth Embodiment

Next, the following describes a configuration of a cutting tool 100 according to a fourth embodiment. The configuration of cutting tool 100 according to the fourth embodiment is different from the configuration of the third embodiment in that a through hole 53 is provided instead of coolant passage groove 48 and coolant feed passage H3 is branched. The other configurations are substantially the same as those of the third embodiment. Accordingly, in the description below, the difference from the configuration of the third embodiment will be mainly described.

Figure 22:
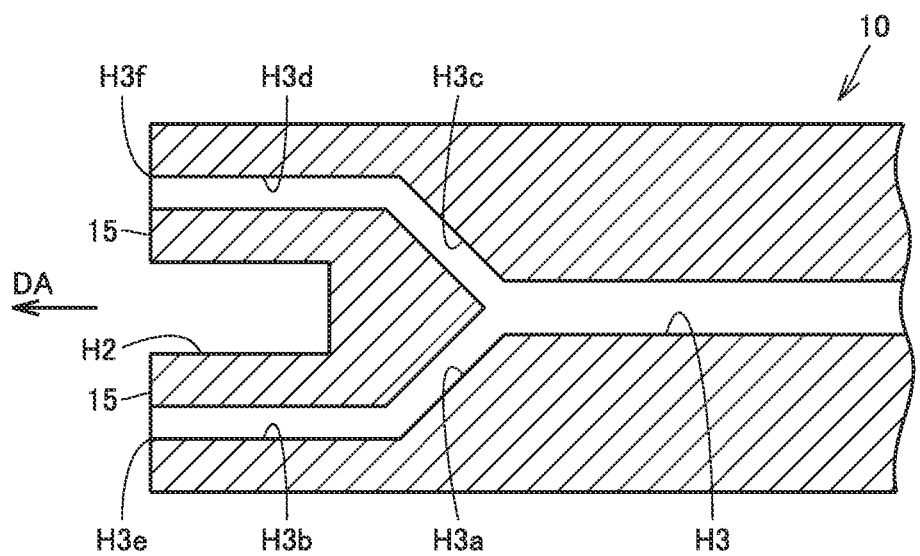
FIG. 22 shows a configuration of a holder of a cutting tool according to a fourth embodiment, when viewed in the direction perpendicular to the axis line.

As shown in FIG. 22, coolant feed passage H3 is provided in holder 10 according to the fourth embodiment, and coolant feed passage H3 may be branched. Coolant feed passage H3 is branched to a first coolant feed passage H3a and a second coolant feed passage H3c, for example. First coolant feed passage H3a may communicate with a third coolant feed passage H3b. Second coolant feed passage H3c may communicate with a fourth coolant feed passage H3d. First coolant feed passage H3a may extend in a direction crossing both coolant feed passage H3 and third coolant feed passage H3b. Similarly, second coolant feed passage H3c may extend in a direction crossing both coolant feed passage H3 and fourth coolant feed passage H3d. Opening H3e of third coolant feed passage H3b may be exposed at bottom surface 15 of holder 10. Similarly, opening H3f of fourth coolant feed passage H3d may be exposed at bottom surface 15 of holder 10.

Figure 23:
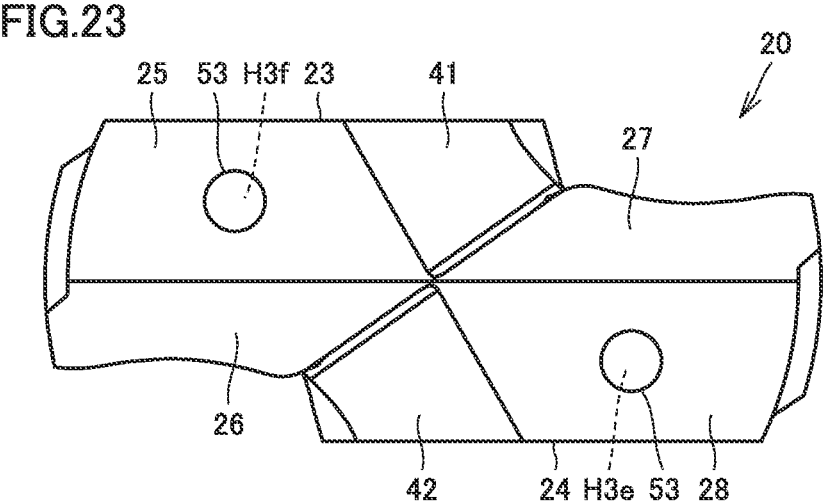
FIG. 23 is a schematic left side view showing the configuration of the head of the cutting tool according to a fourth embodiment.

As shown in FIG. 23, through holes 53 may be provided in head 20 according to the fourth embodiment. Through holes 53 may be provided in first tip surface 25 and fourth tip surface 28, for example. When viewed in the direction parallel to axis line DA, openings H3e, H3f of coolant feed passage H3 may be exposed at through holes 53. In other words, through holes 53 communicate with openings H3e, H3f. Accordingly, the coolant sent out from openings H3e, H3f passes through through holes 53 and is supplied to a workpiece at head 20.

The following describes function and effect of the cutting tool according to the fourth embodiment.

According to cutting tool 100 according to the fourth embodiment, coolant feed passage H3 may be provided in holder 10. When viewed in the direction parallel to axis line DA, opening 65 of coolant feed passage H3 may be exposed at through hole 53 provided in cutting edge portion 51. Accordingly, the coolant can be supplied forwardly of cutting edge portion 51. Hence, the contact portion between the cutting edge portion and the workpiece can be cooled effectively.

EXAMPLE (Preparation of Evaluation Samples)

First, there were prepared five types of heads 20 in which respective inclination angles ϕ of flat surface portions 21 relative to the axis lines of heads 20 were different. Five types of holders 10 respectively corresponding to the five types of heads 20 were prepared. Each holder 10 is provided with first hole H1 inclined in the direction of end surface 15 relative to the straight line perpendicular to the axis line.

First direction D1 in which first hole H1 extends was set to be the same as the normal direction of flat surface portion 21 of head 20. Respective inclination angles ϕ of flat surface portions 21 relative to the axis lines were 0°, 5°, 10°, 15° and 20°. Each inclination angle ϕ is the same as first angle θ1 (see FIG. 8) between first direction D1 in which first hole H1 extends and direction DR perpendicular to axis line DA.

(Evaluation Method)

Figure 24:
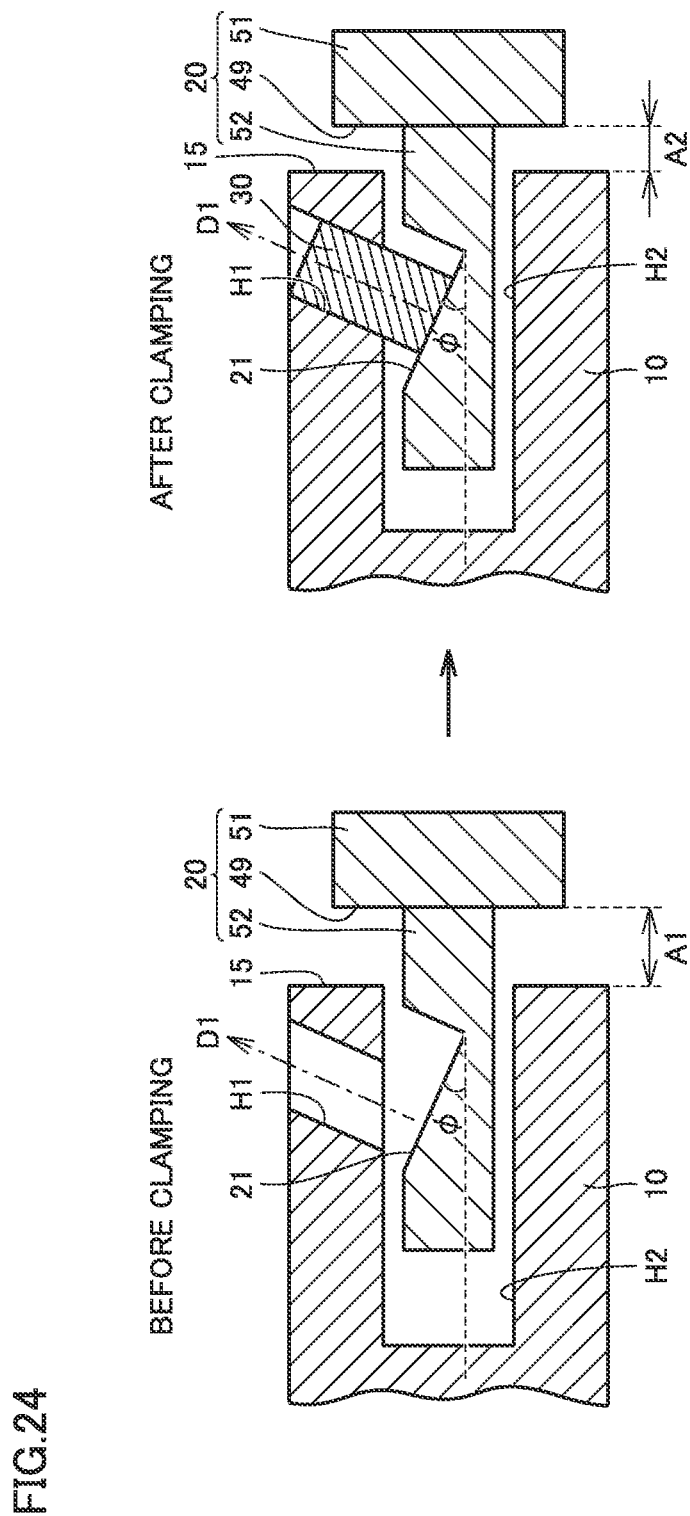
FIG. 24 is a schematic cross sectional view for illustrating an evaluation method in an Example.

First, a portion of shank portion 52 of head 20 was inserted into second hole H2 of holder 10 such that a distance in the axis line direction between end surface 15 of holder 10 and seating surface 49 of cutting edge portion 51 of head 20 became 1 mm (see a state before clamping in FIG. 24). Before the clamping, a distance A1 in FIG. 24 was set at 1 mm. Next, a clamp screw 30 serving as the fastening portion was inserted into first hole H1 of holder 10. Next, by clamping clamp screw 30 using, for example, a screwdriver, shank portion 52 of head 20 was drawn into second hole H2. The lower surface of clamp screw 30 was brought into abutment with flat surface portion 21 of the shank portion. After completing the clamping of clamp screw 30, a distance A2 between end surface 15 of holder 10 and seating surface 49 of cutting edge portion 51 of head 20 was measured (see a state before the clamping in FIG. 24).

(Evaluation Result)

Figure 25:
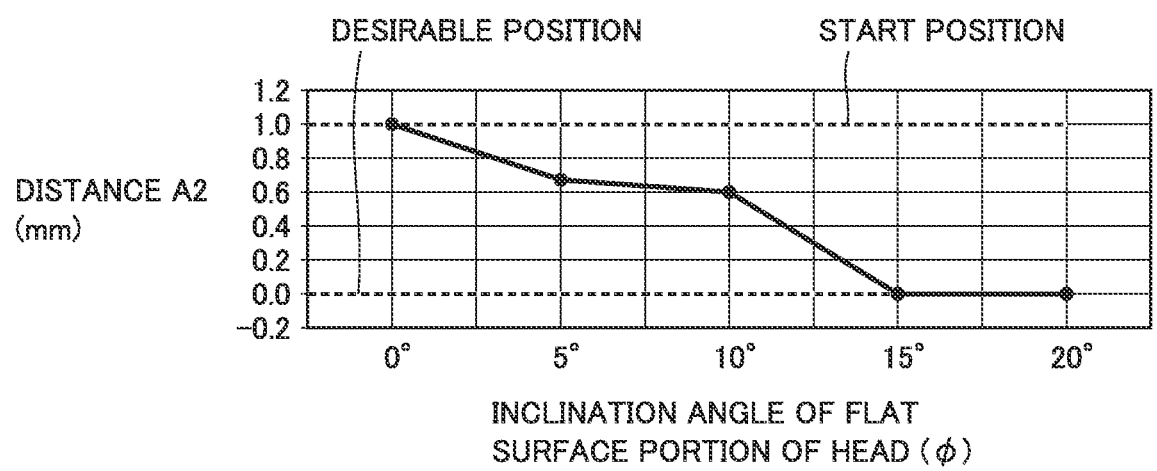
FIG. 25 shows a relation between an inclination angle of a flat surface portion of the head and a distance between a tip surface of the holder and a bottom surface of a cutting edge portion of the head.

FIG. 25 shows a relation between distance A2 and inclination angle ϕ of flat surface portion 21 of head 20. When shank portion 52 of head 20 is not drawn into second hole H2 of holder 10 at all, distance A2 is 1 mm. On the other hand, when shank portion 52 of head 20 is completely drawn into second hole H2 of holder 10, distance A2 is 0 mm. As shown in FIG. 25, as inclination angle ϕ of flat surface portion 21 of head 20 becomes larger, distance A2 becomes smaller. That is, as inclination angle ϕ of flat surface portion 21 of head 20 becomes larger, shank portion 52 of head 20 is more likely to be drawn into second hole H2 of holder 10. Moreover, when inclination angle ϕ is more than or equal to 15°, distance A2 becomes 0 mm, with the result that seating surface 49 of cutting edge portion 51 of head 20 is brought into abutment with end surface 15 of holder 10. As a result, head 20 is firmly fixed to holder 10. Hence, inclination angle ϕ is desirably more than or equal to 15°. On the other hand, as inclination angle ϕ becomes larger, first hole H1 becomes longer, with the result that the rigidity of holder 10 is decreased. Hence, inclination angle ϕ is desirably more than or equal to 15° and less than or equal to 20°. By the above experiment, it was confirmed that first angle θ1 (see FIG. 8) is desirably more than or equal to 15° and less than or equal to 20°.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

10: holder; 11: first surface; 12: second surface; 13, 25: first tip surface; 14, 26: second tip surface; 15: bottom surface (end surface); 16: second flute surface; 17: first flute surface; 18: second side surface; 19: first side surface; 20: head; 21: flat surface portion; 22: curved surface portion; 23: third surface; 24: fourth surface; 27: third tip surface; 27a: first cutting edge; 27b: second cutting edge; 28: fourth tip surface; 30: fastening portion (clamp screw); 31: contact surface; 32: tip; 33: main body portion; 41: fifth tip surface; 42: sixth tip surface; 43: first rake face; 44: tip; 45: rear end portion; 46: second rake face; 47: swaging prevention groove; 48: coolant passage groove (groove); 49: seating surface; 51: cutting edge portion; 52: shank portion; 53: through hole; 60: holding portion; 61: first inclined surface; 62: second inclined surface; 63: flat portion; 64: rear end surface; 65, H3e, H3f: opening; 70: recess; 71: curved portion; 72: contact portion; 100: cutting tool; A1, A2, L1, L2: distance; B1, B2, B3, B4, B5: straight line; C1: circle; C2, C3, C4, C5: contact point; D1: first direction; D2: second direction; D3: third direction; D4: fourth direction; D5: fifth direction; DA: axis line; DR: direction; H1: first hole; H2: second hole; H2a: surface; H3: coolant feed passage; H3b: third coolant feed passage; H3d: fourth coolant feed passage; H3a: first coolant feed passage; H3c: second coolant feed passage; L1, L2, L3, L4: minimum distance; R: radius; R1: rotation direction.

The invention claimed is:

1. A cutting tool comprising:
a holder having a first surface and a second surface provided to be separated from each other to sandwich an axis line;
a head including a cutting edge portion located between the first surface and the second surface, and a shank portion configured to hold the cutting edge portion; and
a fastening portion configured to fix the head to the holder, the holder being provided with a first hole and a second hole, the first hole extending in a first direction and a third direction, the first direction being inclined by a first angle toward the cutting edge portion relative to a direction perpendicular to the axis line, the third direction being inclined by a second angle relative to a second direction extending from the second surface toward the first surface when viewed in a direction parallel to the axis line, the second hole communicating with the first hole, the second hole extending in the direction parallel to the axis line,
the shank portion having a flat surface portion, the shank portion being provided inside the second hole,
the fastening portion being provided inside the first hole, the fastening portion being in contact with the flat surface portion,
in a plane perpendicular to the axis line, a third angle between the second direction and a fourth direction perpendicular to the flat surface portion being larger than the second angle,
the third angle being less than 90°, and
a contact surface of the fastening portion is inclined with respect to the flat surface portion when viewed in a cross-sectional surface perpendicular to the axis line.

2. The cutting tool according to claim 1, wherein the first angle is more than or equal to 13°.

3. The cutting tool according to claim 1, wherein the second angle is more than or equal to 10° and less than or equal to 45°.

4. The cutting tool according to claim 1, wherein a value obtained by subtracting the second angle from the third angle is less than or equal to 5°.

5. The cutting tool according to claim 1, wherein
the cutting edge portion includes a third surface facing the first surface, and a fourth surface facing the second surface, and
when viewed in the direction parallel to the axis line, a minimum distance between the first surface and the axis line is longer than a minimum distance between the second surface and the axis line, and a minimum distance between the third surface and the axis line is longer than a minimum distance between the fourth surface and the axis line.

6. The cutting tool according to claim 1, wherein the shank portion has a contact portion opposite to the flat surface portion, and is provided with a swaging prevention groove located between the flat surface portion and the contact portion.

7. The cutting tool according to claim 1, wherein
a coolant feed passage is provided in the holder, and
when viewed in the direction parallel to the axis line, an opening of the coolant feed passage is exposed from a groove provided in the cutting edge portion.

8. The cutting tool according to claim 1, wherein
a coolant feed passage is provided in the holder, and
when viewed in the direction parallel to the axis line, an opening of the coolant feed passage is exposed at a through hole provided in the cutting edge portion.

* * * * *